United States Patent
Yamagishi

(10) Patent No.: US 10,264,296 B2
(45) Date of Patent: Apr. 16, 2019

(54) RECEPTION APPARATUS, RECEPTION METHOD, TRANSMISSION APPARATUS, AND TRANSMISSION METHOD

(71) Applicant: SONY CORPORATION, Tokyo (JP)

(72) Inventor: Yasuaki Yamagishi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 7 days.

(21) Appl. No.: 15/302,371

(22) PCT Filed: Feb. 12, 2016

(86) PCT No.: PCT/JP2016/054070
§ 371 (c)(1),
(2) Date: Oct. 6, 2016

(87) PCT Pub. No.: WO2016/136489
PCT Pub. Date: Sep. 1, 2016

(65) Prior Publication Data
US 2017/0041643 A1 Feb. 9, 2017

(30) Foreign Application Priority Data
Feb. 27, 2015 (JP) .................................. 2015-038060

(51) Int. Cl.
*H04N 21/235* (2011.01)
*H04N 21/438* (2011.01)
(Continued)

(52) U.S. Cl.
CPC ....... *H04N 21/235* (2013.01); *H04L 65/4076* (2013.01); *H04L 65/608* (2013.01);
(Continued)

(58) Field of Classification Search
CPC .............. H04N 21/235; H04N 21/633; H04N 21/64322; H04N 21/84
See application file for complete search history.

(56) References Cited

U.S. PATENT DOCUMENTS

| | | | |
|---|---|---|---|
| 2003/0214958 A1* | 11/2003 | Madour | H04L 12/14 370/401 |
| 2007/0237184 A1* | 10/2007 | Park | H04H 20/30 370/487 |

(Continued)

FOREIGN PATENT DOCUMENTS

| | | |
|---|---|---|
| EP | 3 220 594 A1 | 9/2017 |
| JP | 2008-503946 A | 2/2008 |

(Continued)

OTHER PUBLICATIONS

International Search Report dated May 10, 2016 in PCT/JP2016/054070 filed Feb. 12, 2016.

(Continued)

*Primary Examiner* — Alexander Q Huerta
(74) *Attorney, Agent, or Firm* — Oblon, McClelland, Maier & Neustadt, L.L.P.

(57) ABSTRACT

The present technology relates to a reception apparatus, a reception method, a transmission apparatus, and a transmission method and more particularly to a reception apparatus, a reception method, a transmission apparatus, and a transmission method, by which bearers transmitted by a plurality of transmission systems are selected appropriately. The reception apparatus acquires control information including information for acquiring data transmitted through a session in a first transmission system at a first layer in a protocol stack of an IP (Internet Protocol) transmission system and for identifying a bearer that transmits the data in a second transmission system at a second layer lower than the first layer; and controls an operation of each unit that acquires the data transmitted on the bearer on the basis of the control information. The present technology is applicable to a television receiver corresponding to ATSC3.0, for example.

18 Claims, 26 Drawing Sheets

(51) Int. Cl.
*H04W 4/06* (2009.01)
*H04L 29/06* (2006.01)
*H04N 21/633* (2011.01)
*H04N 21/643* (2011.01)
*H04N 21/84* (2011.01)
*H04N 21/2381* (2011.01)
*H04N 21/61* (2011.01)
*H04L 29/12* (2006.01)
*H04W 72/00* (2009.01)

(52) U.S. Cl.
CPC ....... *H04N 21/2381* (2013.01); *H04N 21/438* (2013.01); *H04N 21/4382* (2013.01); *H04N 21/6112* (2013.01); *H04N 21/6125* (2013.01); *H04N 21/633* (2013.01); *H04N 21/64322* (2013.01); *H04N 21/84* (2013.01); *H04W 4/06* (2013.01); *H04L 61/2007* (2013.01); *H04W 72/005* (2013.01)

(56) References Cited

U.S. PATENT DOCUMENTS

| | | | | |
|---|---|---|---|---|
| 2007/0291709 A1* | 12/2007 | Wassingbo | ......... | G06Q 30/0601 370/338 |
| 2008/0293428 A1* | 11/2008 | Rey | ......... | H04L 12/18 455/452.2 |
| 2009/0296624 A1* | 12/2009 | Ryu | ......... | H04H 20/72 370/312 |
| 2011/0153756 A1* | 6/2011 | Angle | ......... | H04L 51/14 709/206 |
| 2011/0255460 A1* | 10/2011 | Lohmar | ......... | H04W 48/16 370/312 |
| 2013/0176944 A1* | 7/2013 | Luo | ......... | H04W 8/26 370/328 |
| 2013/0182643 A1* | 7/2013 | Pazos | ......... | H04L 65/4076 370/328 |
| 2013/0294747 A1* | 11/2013 | Takahashi | ......... | H04N 21/2187 386/241 |
| 2014/0372624 A1* | 12/2014 | Wang | ......... | H04L 65/60 709/231 |
| 2016/0127798 A1 | 5/2016 | Yamagishi | | |
| 2016/0205158 A1* | 7/2016 | Lo | ......... | H04L 65/4076 709/219 |
| 2016/0345033 A1* | 11/2016 | Kwak | ......... | H04N 21/2343 |
| 2016/0373489 A1* | 12/2016 | Lee | ......... | H04L 29/06 |
| 2017/0048294 A1* | 2/2017 | Kwak | ......... | H04N 21/2362 |
| 2017/0134764 A1* | 5/2017 | Yamagishi | ......... | H04N 21/235 |
| 2017/0245184 A1* | 8/2017 | Nagesh Shetigar | ..... | H04J 11/00 |

FOREIGN PATENT DOCUMENTS

| | | |
|---|---|---|
| JP | 2012-044619 A | 3/2012 |
| JP | 2012-513690 A | 6/2012 |
| WO | WO 2014/188886 A1 | 11/2014 |

OTHER PUBLICATIONS

"Information technology—Dynamic adaptive streaming over HTTP (DASH)—Part 1: Media presentation description and segment formats", ISO/IEC 23009-1, First Edition, Apr. 1, 2012 (133 sheets).
Extended European Search Report dated Jun. 15, 2018 in Application No. 16755236.3-1208/3264729 PCT/JP2016054070, 12 pages.
Rich Chernock/Triveni Digital; Next Generation Television: ATSC 3.0; Chair, ATSC TG3, Oct. 30, 2014, 46 pages.
3GPP TR 26.848 V12.0.0, (Dec. 2014); 3$^{rd}$ Generation Partnership Project; Technical Specification Group Services and System Aspects; Multimedia Broadcast/Multicast Service (MBMS); Enhanced MBMS operation, (Release 12), 61 pages.

* cited by examiner

| Element or Attribute Name | Use | Description |
|---|---|---|
| LSID | | Description of LCT session group |
| @version | O | Version of this LCT Session Instance Description. The version is increased by one when the descriptor is updated. The received LSID with highest version number is the currently valid version. |
| @validFrom | O | The date and time from which the LSID is valid. If not present, the receiver should assume the LSID version is valid immediately. |
| @expiration | O | The date and time when the LSID expires. If not present, the receiver should assume the LSID is valid for all time, or until it receives a newer LSID with an associated expiration value. |
| TransportSession | 1..N | Description of LCT session |
| @tsi | M | Address parameter for identifying LCT session |
| @datapipeID | O | Specifies the identifier of ATSC 3.0 physical layer data pipe carrying delivery objects of the source or repair flow. |
| sourceFlow | 0..1 | Description of source stream (see Annex) |
| repairFlow | 0..1 | Description of repair stream (see Annex) |

Legend:
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs=0)
Elements are bold; attributes are non-bold and preceded with an @.

FIG.13

| Extended LSID |
|---|

| Attributes of ROUTE session 1<br>　TSI(tsi1)<br>　sIPAdrs(sIPAdrs1),<br>　dIPAdrs(dIPAdrs1)<br>　Port(Port1)<br>　Attributes of other data transferred | Attributes of ROUTE session 2<br>　TSI(tsi1)<br>　sIPAdrs(sIPAdrs1),<br>　dIPAdrs(dIPAdrs2)<br>　Port(Port1)<br>　Attributes of other data transferred |
|---|---|
| Attributes of ROUTE session 2<br>　TSI(tsi2)<br>　sIPAdrs(sIPAdrs1),<br>　dIPAdrs(dIPAdrs1)<br>　Port(Port1)<br>　Attributes of other data transferred | |

FIG.16

```
LSID/
  ...
  TransportSession/
    @tsi (Identifier of LCT session)
    @BroadcastStreamID (BroadcastStream Identifier in ATSC3.0, optional)
    @PLPID (PLP Identifier in ATSC3.0, optional)
    @TMGI (TMGI Identifier in 3GPP-MBMS, optional)
    @DVBTriplet-pid(Set of DVB-triplet and pid in DVB-based IP broadcasting, optional)
    ...;
    @sourceIPAddress (Optional)
    @destinationIPAddress (Optional)
    @port (Optional)
    SourceFlow (Optional) /
  ...
```

FIG.18

```
<LSID ... >
  <TransportSession @tsi="xxx" @BroadcastStreamID="yyy" @PLPID="zzz" @tmgi="www"
  @DVBTriplet-pid="onidX.tsidX.sidX.pidX"...>
    ...
  </TransportSession>
  ...
</LSID>
```

FIG.19

```
LSID/
  TransportSession/
    @tsi (Identifier of LCT session)
    @sourceIPAddress (Optional)
    @destinationIPAddress (Optional)
    @port (Optional)
    ATSCBearerID (Element for storing a set of BroadcastStreamID and PLPID in the case of ATSC3.0, optional)
    3GPPBearerID (Element for storing tmgi in the case of 3GPP-MBMS, optional)
    DVBTSBearerID (Element for storing a set of DVB-triplet and pid, optional)
    ...
    SourceFlow (Optional) /
    ...
```

FIG.20

```
<LSID ... >
  <TransportSession @tsi="xxx" ...>
    <ATSCBearerID @BroadcastStreamID="yyy" PLPID="zzz">
    <3GPPBearerID @tmgi="www">
    <DVBTSBearerID @DVBTriplet="onidX.tsidX.sidX" @pid="pidX">
    ...
  </TransportSession>
  ...
</LSID>
```

FIG.21

RECEPTION APPARATUS, RECEPTION METHOD, TRANSMISSION APPARATUS, AND TRANSMISSION METHOD

TECHNICAL FIELD

The present technology relates to a reception apparatus, a reception method, a transmission apparatus, and a transmission method and more particularly to a reception apparatus, a reception method, a transmission apparatus, and a transmission method, by which bearers transmitted by a plurality of transmission systems are selected appropriately.

BACKGROUND ART

In recent years, main streaming services on the Internet are becoming so-called OTT-V (Over The Top Video). A widespreading basic technology of the OTT-V is MPEG-DASH (Dynamic Adaptive Streaming over HTTP) (see Non-Patent Document 1, for example).

The MPEG-DASH is based on a streaming protocol based on HTTP (Hypertext Transfer Protocol). As to contents suitable for simultaneous multi-destination delivery, it is contemplated that the bearers of a multicast (MC) and a broadcast (BC) are used in combination to decrease network resource loads.

Non-Patent Document 1: ISO/IEC 23009-1:2012

SUMMARY

Problem to be Solved

By the way, when data of the contents suitable for broadcasting is transmitted by a plurality of transmission systems, it is necessary to provide a technology for appropriately selecting the bearers transmitted by different transmission systems.

The present technology has been made in view of the above-mentioned circumstances to be capable of appropriately selecting the bearers transmitted by a plurality of transmission systems.

Means for Solving the Problem

A reception apparatus according to a first aspect of the present technology is a reception apparatus including: an acquisition unit that acquires control information including information for acquiring data transmitted through a session in a first transmission system at a first layer in a protocol stack of an IP (Internet Protocol) transmission system and for identifying a bearer that transmits the data in a second transmission system at a second layer lower than the first layer; and a control unit that controls an operation of each unit that acquires the data transmitted on the bearer on the basis of the control information.

The reception apparatus according to the first aspect of the present technology may be an independent apparatus or may be an internal block configuring a single apparatus. A reception method according to a first aspect of the present technology is a reception method corresponding to the reception apparatus according to the first aspect of the present technology.

In the reception apparatus and the reception method according to the first aspect of the present technology, control information including information for acquiring data transmitted through a session in a first transmission system at a first layer in a protocol stack of an IP (Internet Protocol) transmission system and for identifying a bearer that transmits the data in a second transmission system at a second layer lower than the first layer is acquired; and an operation of each unit that acquires the data transmitted on the bearer is controlled on the basis of the control information.

A reception apparatus according to a second aspect of the present technology is a transmission apparatus including: a generation unit that generates control information including information for acquiring data transmitted through a session in a first transmission system at a first layer in a protocol stack of an IP transmission system and for identifying a bearer that transmits the data in a second transmission system at a second layer lower than the first layer; and a transmission unit that transmits the data by the bearer identified by information included in the control information together with the control information.

The reception apparatus according to the second aspect of the present technology may be an independent apparatus or may be an internal block configuring a single apparatus. A reception method according to a second aspect of the present technology is a transmission method corresponding to the reception apparatus according to the second aspect of the present technology.

In the reception apparatus and the reception method according to the second aspect of the present technology, control information including information for acquiring data transmitted through a session in a first transmission system at a first layer in a protocol stack of an IP transmission system and for identifying a bearer that transmits the data in a second transmission system at a second layer lower than the first layer is generated; and the data is transmitted by the bearer identified by information included in the control information together with the control information.

Effects

In accordance with the first aspect and the second aspect of the present technology, it is possible to appropriately select transmitted by a plurality of transmission systems.

It should be noted that the effect described here is not necessarily limitative and may be any effect described in the present disclosure.

BRIEF DESCRIPTION OF DRAWINGS

FIG. 1 A diagram showing a protocol stack of 3GPP-(e)MBMS.

FIG. 9 A diagram showing a protocol stack of 3GPP-(e)MBMS envisaged in the future.

FIG. 13 A diagram showing a detailed content of an LSID element.

FIG. 16 A diagram showing other structure of an extended LSID.

FIG. 18 A diagram showing a first structure of an extended LSID.

FIG. 19 A diagram showing a specific description example of the first structure of an extended LSID.

FIG. 20 A diagram showing a second structure of an extended LSID.

FIG. 21 A diagram showing a specific description example of the second structure of an extended LSID.

DESCRIPTION OF PREFERRED EMBODIMENTS

Figure 2:
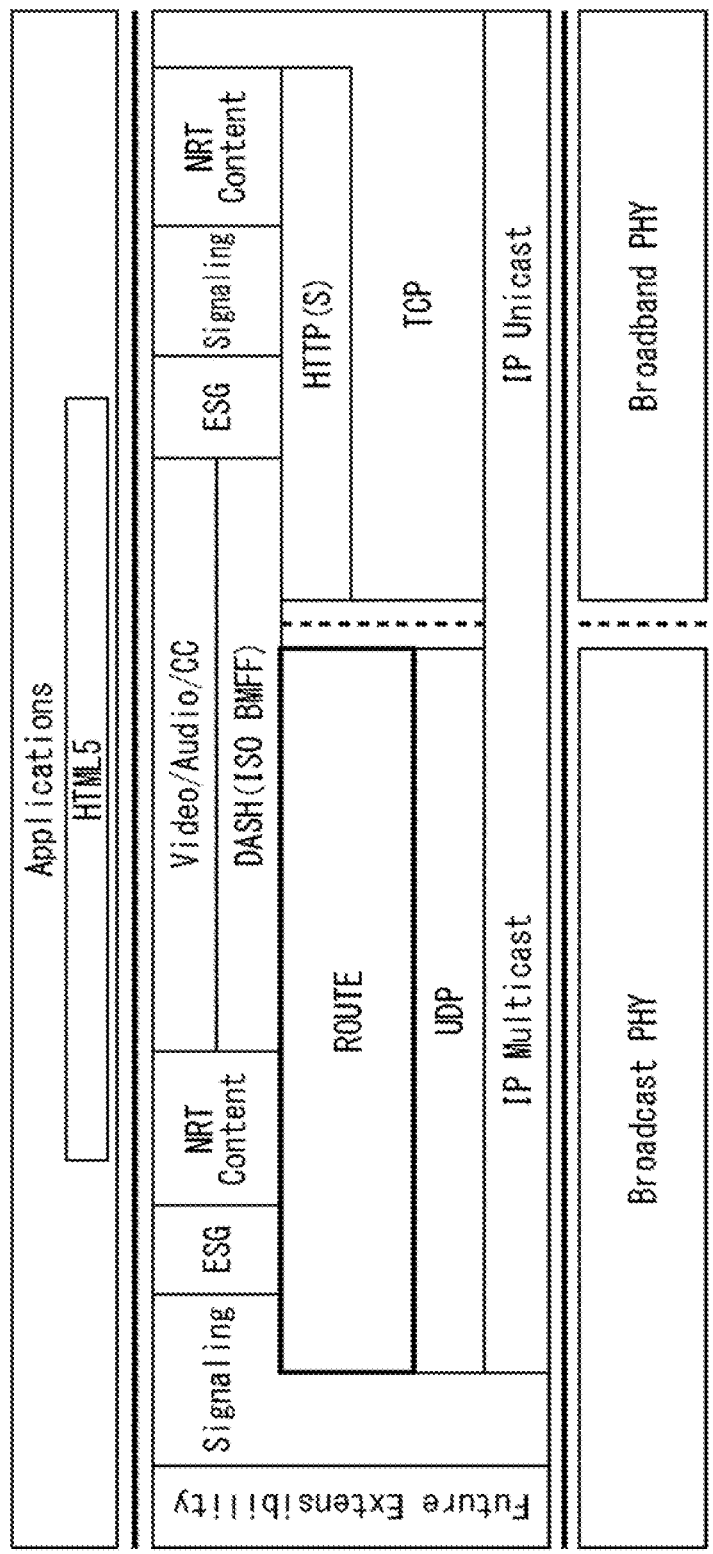
FIG. 2 A diagram showing a protocol stack of ATSC3.0.

Hereinafter, embodiments of the present technology will be described with reference to the drawings. Note that descriptions will be made in the following order.

1. Outline of Digital Broadcasting in IP Transmission System
2. System Configuration
3. Extended LSID to which the present technology is applied
(1) Outline of LSID
(2) Extended LSID
(3) Transport Bearer Identification by Extended LSID
4. Specific Application Example of System
5. Apparatuses Configuration in System
6. Flow of Processing Executed by Apparatuses in System
7. Alternative Embodiment
8. Configuration of Computer <1. Outline of Digital Broadcasting in IP Transmission System>

In a digital broadcasting standard in each country, an MPEG2-TS (Moving Picture Experts Group phase 2-Transport Stream) system is employed as a transmission system. It is assumed that more enhanced services are provided in the future by introducing the IP transmission system where IP (Internet Protocol) packets used in the field of communication are used for digital broadcasting. In particular, in ATSC (Advanced Television Systems Committee) 3.0, a next generation broadcasting standard in the United States that has been currently formulated, digital broadcasting using the IP transmission system is expected to be employed.

Hereinafter, an outline of the digital broadcasting using the IP transmission system is described. Here, an outline of 3GPP-(e)MBMS (Multimedia Broadcast Multicast Service) formulated by 3GPP (Third Generation Partnership Project) that is a standardization project of a mobile communication system is firstly described.

(Protocol Stack of 3GPP-(e)MBMS)

Figure 1:
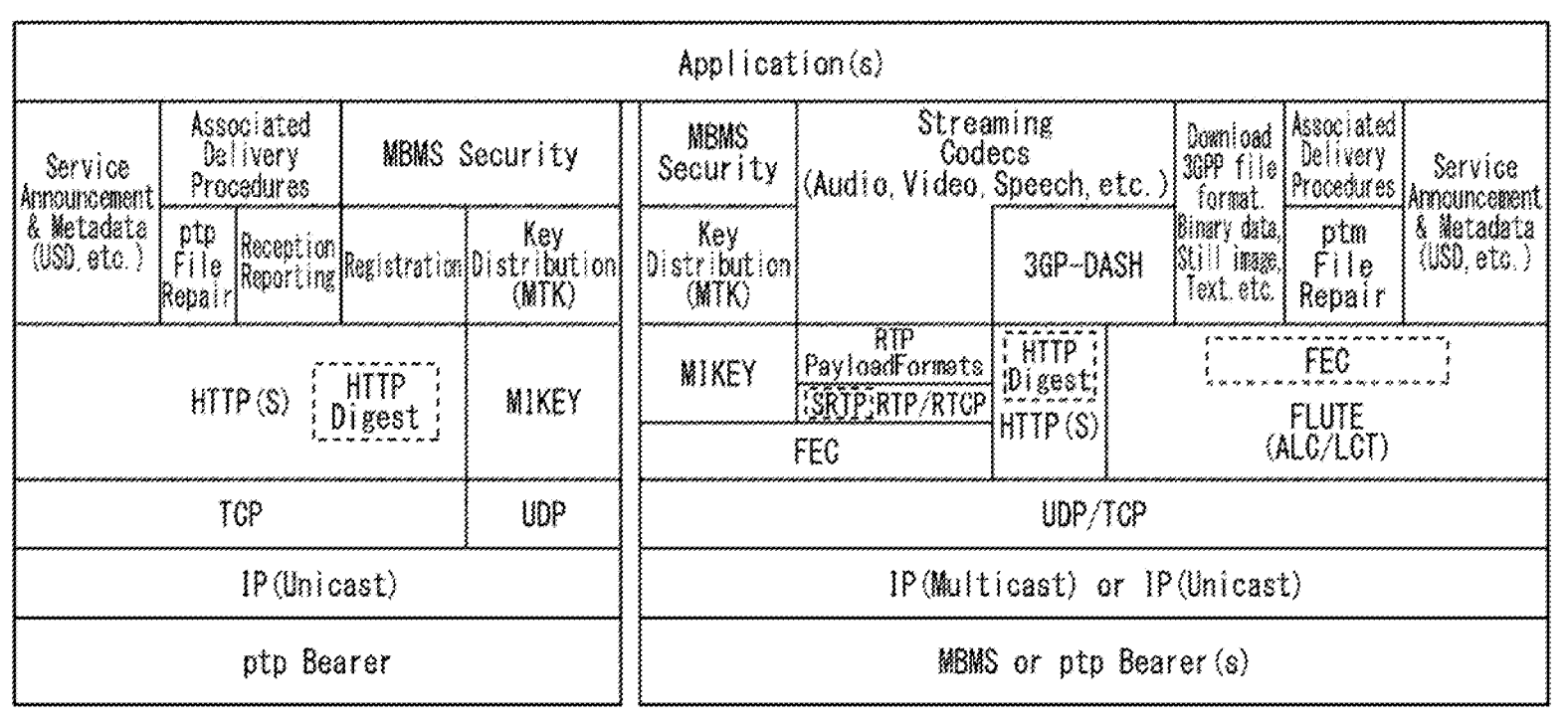

FIG. 1 is a diagram showing a protocol stack of 3GPP-(e)MBMS.

In FIG. 1, a lowest hierarchy is a physical layer. In 3GPP-(e)MBMS, when a transmission system on the right-hand side of the figure is used, the physical layer uses either of one directional MBMS or both directional ptp Bearer(s).

An upper hierarchy adjacent to the physical layer is an IP layer. In addition, an upper hierarchy adjacent to the IP layer is a UDP/TCP layer. That is to say, when the MBMS is used as the physical layer, an IF multicast is used in the IP layer, and a UDP (User Datagram Protocol) is used in the UDP/TCP layer. On the other hand, when the ptp Bearer(s) is used as the physical layer, an IP unicast is used in the IP layer, and a TCP (Transmission Control Protocol) is used in the UDP/TCP layer.

The upper hierarchies adjacent to the UDP/TCP layer are FEC, HTTP(S), FLUTE. The FLUTE (File Delivery over Unidirectional Transport) is a protocol for file transfer in the multicast. Note that FEC (Forward Error Correction) is applied to the FLUTE. A detail of the FLUTE will be described below by referring to FIG. 3, and the like.

The upper hierarchies adjacent to the FLUTE are 3GP-DASH, Download 3GPP file format etc., ptm File Repair, Service Announcement & Metadata. The upper hierarchy adjacent to the ptm File Repair is Associated Delivery Procedures.

The upper hierarchy adjacent to 3GP-DASH (Dynamic Adaptive Streaming over HTTP) is stream data such as audio and video. That is to say, the stream data such as audio and video configuring contents can be transmitted through a FLUTE session in units of media segments complying with an ISO BMFF (Base Media File Format) standard.

In addition, USD (User Service Description) and MPD (Media Presentation Description) can be provided as the control information of the stream data transmitted through the FLUTE session on Service Announcement & Metadata, for example. Therefore, the control information such as the USD and the MPD can also be transmitted through the FLUTE session.

In this manner, 3GPP-(e)MBMS specifies protocols for file downloading through the FLUTE session of the files based on a 3GPP file format (ISO BMFF file, MP4 file). By the same protocol, a fragmented MP4 file sequence of the MPEG-DASH and the MPD complying with a standard of the MPEG-DASH can be transmitted. The MPD is referred by the USD. The fragmented MP4 means a fragmented MP4 file.

The upper hierarchy of HTTP(S) that is an upper hierarchy adjacent to the UDP/TCP layer is stream data of 3GP-DASH. That is to way, stream data of the 3GP-DASH can also be transmitted using the HTTP(S). The upper hierarchies of the FEC that is an upper hierarchy adjacent to the UDP/TCP layer is RTP/RTCP and MIKEY. The upper hierarchy of the RTP/RTCP is RTP PayloadFormats, and the further upper hierarchy is stream data. In other words, the stream data can be transmitted through the RTP (Real time Transport Protocol) session. The upper hierarchy of MIKEY is Key Distribution (MTK), and the further upper hierarchy is MBMS Security.

On the other hand, when a transmission system on the left-hand side of the figure is used, the physical layer uses only both directional ptp Bearer(s). An upper hierarchy adjacent to the physical layer is an IP layer. In addition, an upper hierarchy adjacent to the IP layer is a TCP layer, and an upper hierarchy adjacent to the TCP layer is a HTTP(S) layer. Thus, by these hierarchies, the protocol stack that is worked on a network such as the Internet is implemented.

The upper hierarchies adjacent to the HTTP(S) layer are Service Announcement & Metadata, ptm File Repair, Reception Reporting, and Registration. The USD and the MPD can be provided as the control information of the stream data transmitted through the FLUTE session using the transmission system shown on the right-hand side of the figure on Service Announcement & Metadata. Therefore, the control information such as the USD and the MPD can be provided through a server on the Internet, for example.

The upper hierarchies adjacent to ptm File Repair and Reception Reporting are Associated Delivery Procedures. The upper hierarchy adjacent to Registration is MBMS Security. The upper hierarchy adjacent to the UDP layer that is the upper hierarchy adjacent to the IP layer is MIKEY. The upper hierarchy of the MIKEY is Key Distribution (MTK), and the further upper hierarchy is MBMS Security. For example, using the FLUTE session in the case of using the transmission system shown on the right-hand side of the figure and the TCP/IP protocol using the transmission system shown on the left-hand side of the figure, applications can be transmitted.

(Protocol Stack of ATSC3.0)

FIG. 2 is a diagram showing a protocol stack of ATSC3.0.

In FIG. 2, a lowest hierarchy is a physical layer. In a digital broadcasting in an IP transmission system such as ATSC3.0, transmission is not limited to utilize broadcasting, and may utilize communication for a part of data. When broadcasting is utilized, the frequency band of broadcast waves assigned for a service (channel) corresponds to the physical layer (Broadcast PHY).

The upper hierarchy of the physical layer (Broadcast PHY) is an IP layer (IP multicast). The IP layer corresponds to an IP(Internet Protocol) in the protocol stack of TCP/IP. IP packets are specified by an IP address. The upper hierarchy adjacent to the IP layer is a UDP layer, the further upper hierarchy is ROUTE (Real-time Object Delivery over Unidirectional Transport). The ROUTE is a protocol for file transfer in the multicast, and extends FLUTE. A detail of the ROUTE will be described below by referring to FIG. 3, and the like.

Parts of the hierarchy within the upper hierarchies adjacent to ROUTE are ESG (Electronic Service Guide) service and NRT contents. Files of the ESG service and the NRT contents are transmitted through a ROUTE session. The ESG service is an electronic service guide (program information). The NRT contents are contents transmitted in NRT (Non Real Time) broadcasting, stored in a storage of the reception unit, and then regenerated. Note that the NRT contents are illustrative contents and other content files may be transmitted through the ROUTE session.

Other hierarchy other than the above-described hierarchies within the upper hierarchies adjacent to the ROUTE is DASH (ISO BMFF). The upper hierarchies adjacent to DASH (ISO BMFF) are stream data of components such as video, audio, a closed caption (CC) and the like. That is to say, stream data of components such as video, audio, a closed caption and the like can be transmitted through the ROUTE session in units of media segments complying with a standard of ISO BMFF.

The hierarchy across the upper hierarchy adjacent to the physical layer (Broadcast PHY) and the hierarchy adjacent to the ROUTE is signaling information (Singaling). For example, signaling information includes LLS (Link Layer Signaling) signaling information and SLS (Service Level Singaling) signaling information.

The LLS signaling information is low-layer signaling information not depending on services. For example, the LLS signaling information includes metadata such as FIT (Fast Information Table), EAD (Emergency Alerting Description), RRD (Region Rating Description) and the like. The FIT includes stream or service configuration information in a broadcasting network such as information necessary for service selection. The EAD includes information about an emergency alert. The RRD includes information about rating.

The SLS signaling information is signaling information per service. For example, the SLS signaling information includes metadata such as LSID (LCT Session Instance Description) as well as the above-described USD and MPD. The LSID is control information (control meta file) of the ROUTE protocol. A detail of the ROUTE will be described below by referring to FIG. 3, and the like.

On the other hand, when the communication is utilized, the upper hierarchy of the physical layer (Broadband PHY) is an IP layer (IP unicast). The upper hierarchy adjacent to the IP layer is a TCP layer, and the upper hierarchy adjacent to the TCP layer is an HTTP(S) layer. Thus, by these hierarchies, the protocol stack that is worked on a network such as the Internet is implemented.

In this manner, the reception unit communicates with the server on the Internet, for example, using the TCP/IP protocol, and can receive the ESG service, the signaling information, the NRT contents and the like. In addition, the reception unit can receive stream data such as audio and video adaptively streaming delivered from the server on the Internet. Note that the streaming delivery is comply with a standard of the MPEG-DASH.

For example, applications can be transmitted using a broadcasting ROUTE session and a communication TCP/IP protocol. The applications can be described with a markup language such as HTML5 (HyperText Markup Language 5) and the like.

As described above, the protocol stack of ATSC3.0 employs the protocol stack, a part of which corresponds to 3GPP-MBMS. In this manner, stream data such as audio and video configuring the contents can be transmitted in units of media segments complying with a standard of ISO BMFF. When the signaling information such as the SLS signaling information is transmitted by any of broadcasting or communication, the protocol can be common in the hierarchy excluding the physical layer (and the data link layer) that is the lower hierarchy than the IP layer, i.e., the upper hierarchy than the IP layer, thereby reducing implementation burden or processing burden in the reception unit and the like.

(Structure of ROUTE/FLUTE)

Figure 3:
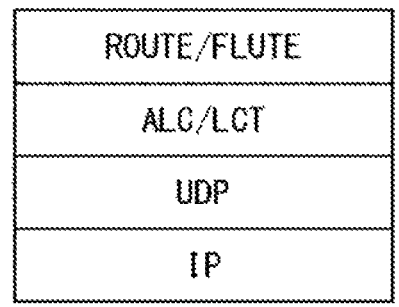
FIG. 3 A diagram showing a structure of ROUTE/FLUTE.

FIG. 3 is a diagram showing a structure of FLUTE in the protocol stack of 3GPP-(e)MBMS in FIG. 1 and ROUTE in the protocol stack of ATSC3.0 in FIG. 2.

Figure 4:
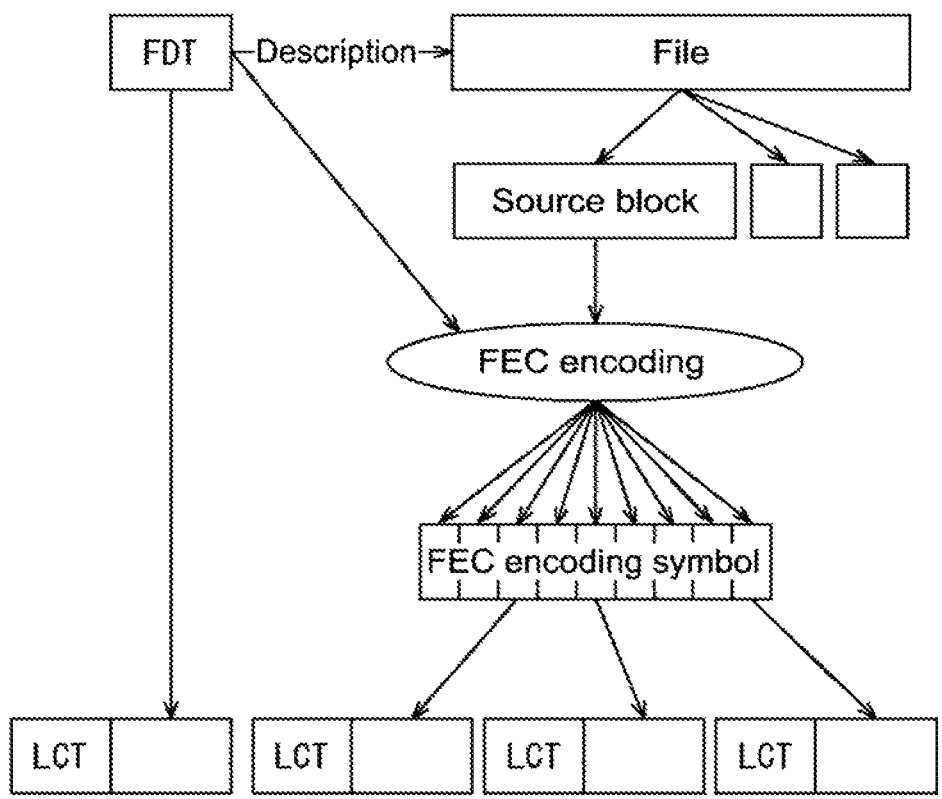
FIG. 4 A diagram showing a detailed structure of FLUTE.

The FLUTE is configured of a multicast protocol of a scalable file object called as ALC (Asynchronous Layered Coding), specifically a combination of LCT (Layered Coding Transport) and FEC (Forward Error Correction) components that are building blocks. FIG. 4 shows a detailed structure of the FLUTE.

Here, the ALC is a protocol suitable for multicast transferring an optional binary file in one direction. Specifically, the ALC has been developed as a high reliable asynchronous one-to-many broadcasting protocol. The ALC utilizes LCT and FEC, performs FEC on a targeted file to be stored in an LCT packet. When the file is transferred on an IP multicast, the file is stored in a UDP packet and an IP packet.

A transport session in the FLUTE is identified by a unique TSI (Transport Session Identifier) within a scope of a source IP address. The FLUTE can change a FEC system per transport session, or per file. In addition, transfer control information in an XML (Extensible Markup Language) format referred to as FDT (File Delivery Table) transferred per transport session is introduced into the FLUTE.

Basic attributes and transfer control parameters of the targeted file are described in an FDT file transferred within the same transport session as of an FEC encoding symbol strode in the LCT packet. The FDT can define mapping of LCT packet columns in which FEC encoding symbol columns corresponding to an identifier of the targeted file are stored, and store a MIME type and a size of a content in each file, a transfer encoding system, a message digest, and parameters necessary for FEC decoding. Note that it is possible to apply FEC to FDT itself. Own FEC parameters will be transmitted in LCT layers, separately.

Figure 5:
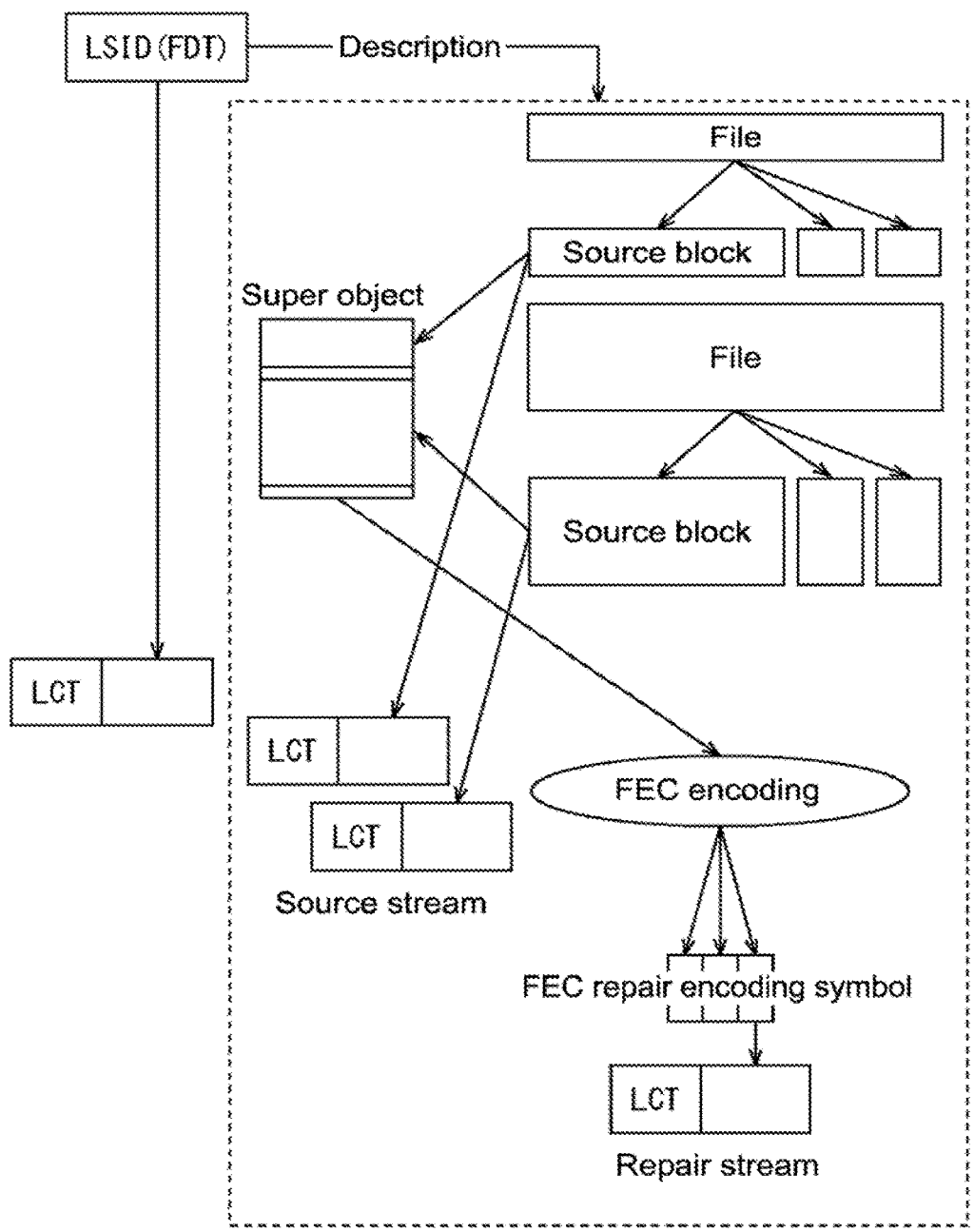
FIG. 5 A diagram showing a detailed structure of ROUTE.

The ROUTE is extended of the FLUTE. A difference may be mainly an object bundle and a media aware fragmentation. FIG. 5 shows a detailed structure of the ROUTE.

The object bundle in the ROUTE is characterized to support in a protocol level a method of generating an FEC repair stream, and a notification of a relationship between a source stream and a repair stream. Specifically, a video or audio stream is bundled from source blocks having different sizes to form one super object, thereby generating the FEC repair stream.

In general, as the audio stream has a data volume (data object) is small per unit time data, the audio stream has a small source object size as compared with the video stream. When repair symbol is generated per stream in the same FEC system to the streams having different source object sizes, error sensitivity is different depending on a large or small size of the source object.

The ROUTE can take out the source blocks from the different source streams having a plurality of rates, and configure the super object. The repair stream can be configured by the FEC repair symbol generated therefrom. That is to say, the repair stream is generated across different types of the source streams. Here, the source streams including source symbols and the repair streams including repair symbols can be transferred through other LCT sessions within the ROUTE session.

Information (control information) about how the super object is configured from the source blocks taken out from a plurality of the source streams to generate FEC streams is described to LSID (LCT Session Instance Description). At a reception unit side, the super object is restored from LCT packet columns transmitted through the ROUTE session based on the information described in the LSID, and the targeted file can be extracted.

In general, a broadcasting stream is a model that multiplexes and transmits all streams configuring services at a transmission unit side, and chooses the stream necessary for own at the reception unit side. Accordingly, in a use case to which the processing model described below is applicable, an FEC configuration method is effective. The processing model is that the super object including all streams configuring services is configured, the super object is restored at the reception unit side, and the necessary stream is chosen.

Figure 6:
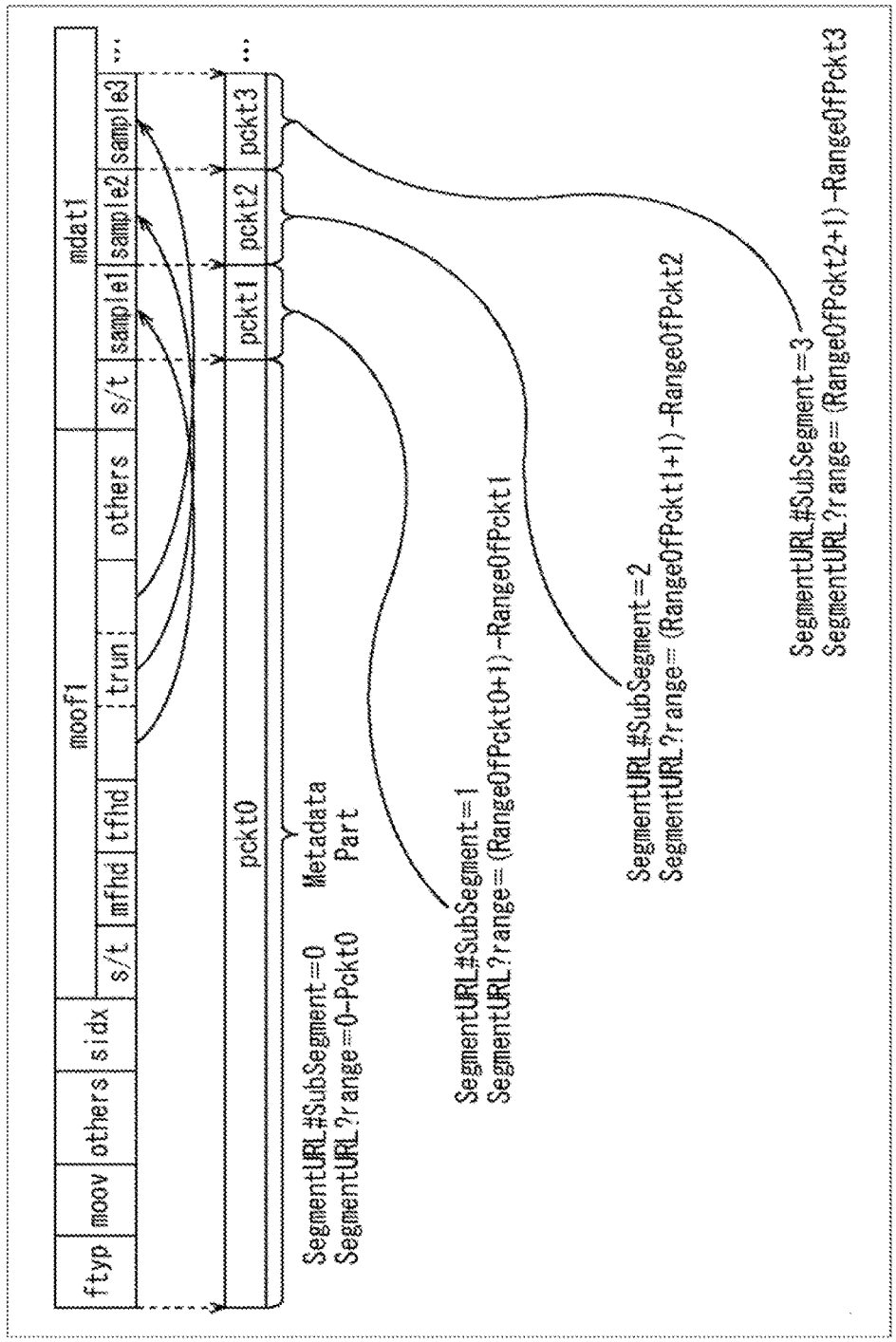
FIG. 6 A diagram showing an example of fragmentation in ROUTE.

As shown in FIG. 6, a media aware fragmentation is possible in the ROUTE. FIG. 6 shows an example of the fragmentation when the DASH segment is an Indexed Self-Initialization segment.

In FIG. 6, a metadata part of the segment is divided at pckt0 that is a first delivery object, and a first sample 1 is stored in pckt1. In order to show boundaries to be separated, an URL (Uniform Resource Locator) of each delivery object is described in the prat corresponding to the FDT corresponding to the LSID. A format of the URL may be a format in an URL of a segment file and a byte range, or a format in an URL of a segment file and a subsegment number. When the subsegment number is "0", it is a metadata part.

As the format of the delivery object, there are prepared a "file mode" that the object itself is stored, and a "entity mode" that an object to which an HTTP entity header is added is stored. These modes are described as attributes of the LSID source streams. The URL and the byte range of the object can be stored in the HTTP entity header, and the attributes described by the FDT in the past can be included therein.

Figure 7:
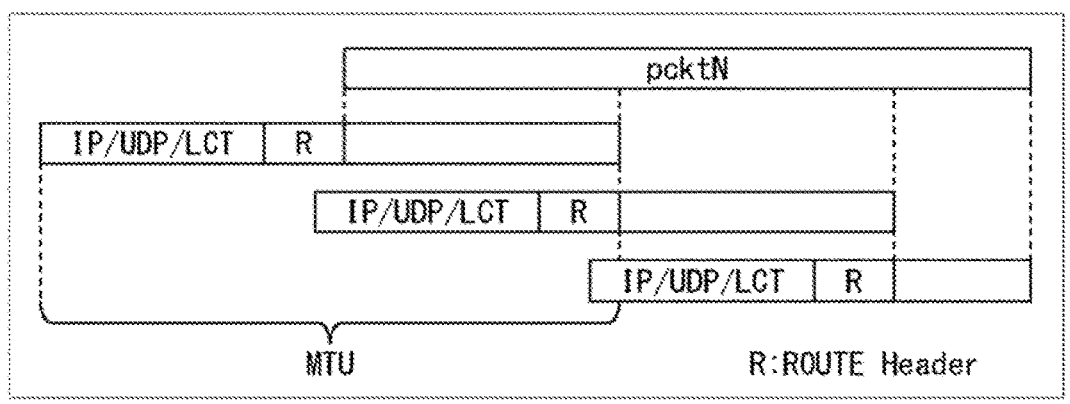
FIG. 7 A diagram showing a disintegration of a ROUTE header.

In the FLUTE, when the targeted file is separated into the source blocks, a predetermined algorithm is applied, and separation is mechanically performed without awaring of processing boundaries of the applications and the like. In contrast, in the ROUTE, the source blocks can be separated at free boundaries irrespective of the applications. FIG. 7 shows an example that the source delivery object is stored in a transport packet. When the source delivery object is stored in a payload of a lower LCT packet, a ROUTE header is added, if separation is necessary, thereby specifying an offset within the delivery object.

Figure 8:
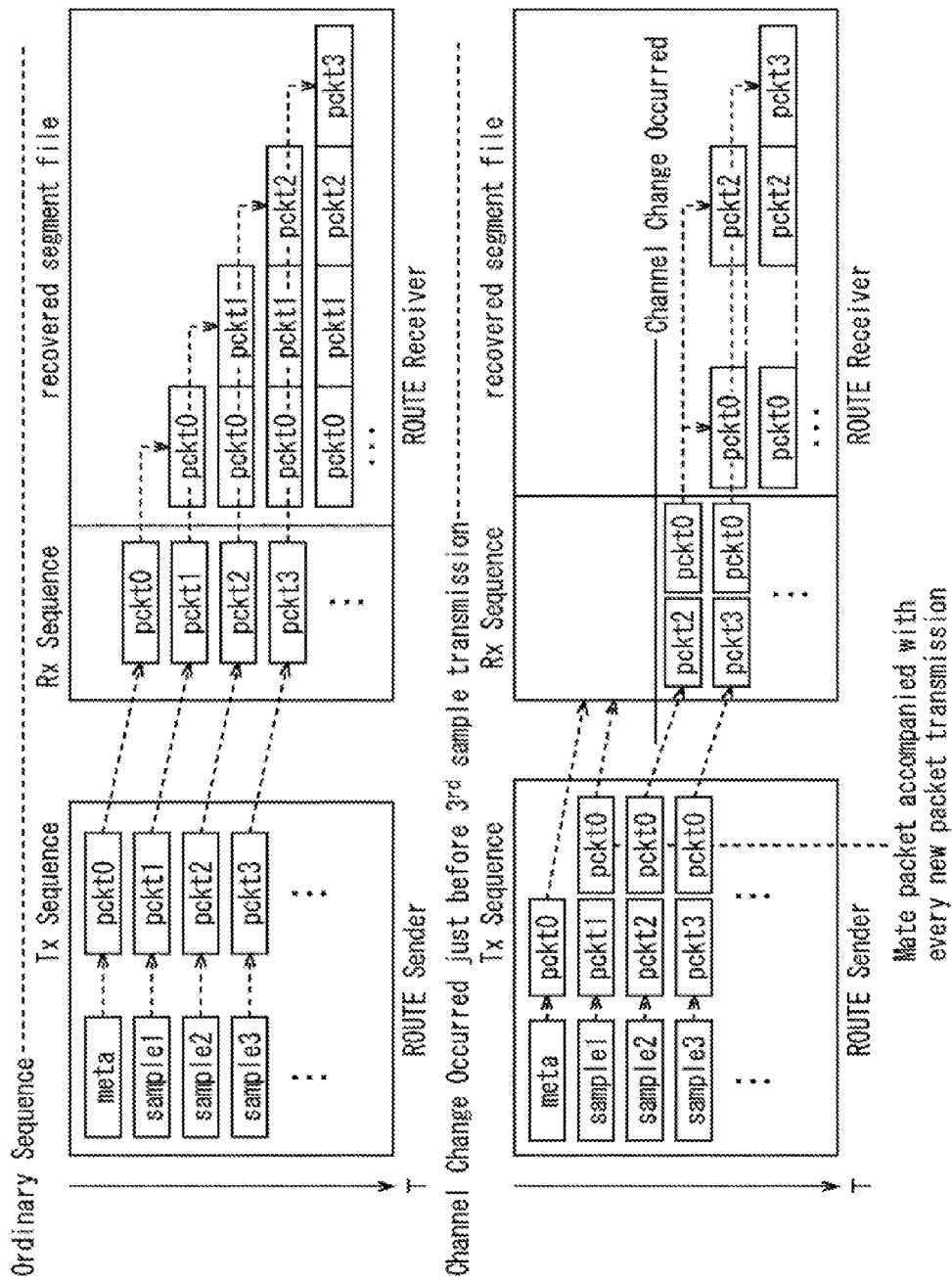
FIG. 8 A diagram showing an example of a fragment transfer sequence by ROUTE.

FIG. 8 shows that data is transferred from a ROUTE server (ROUTE Sender) to a ROUTE client (ROUTE Reception unit) in units of source delivery objects. In general, the delivery objects are transferred in the order. To enhance an experienced speed when a channel is switched, the delivery object in which metadata such as SLS signaling information is stored can be frequently resend.

Figure 9:
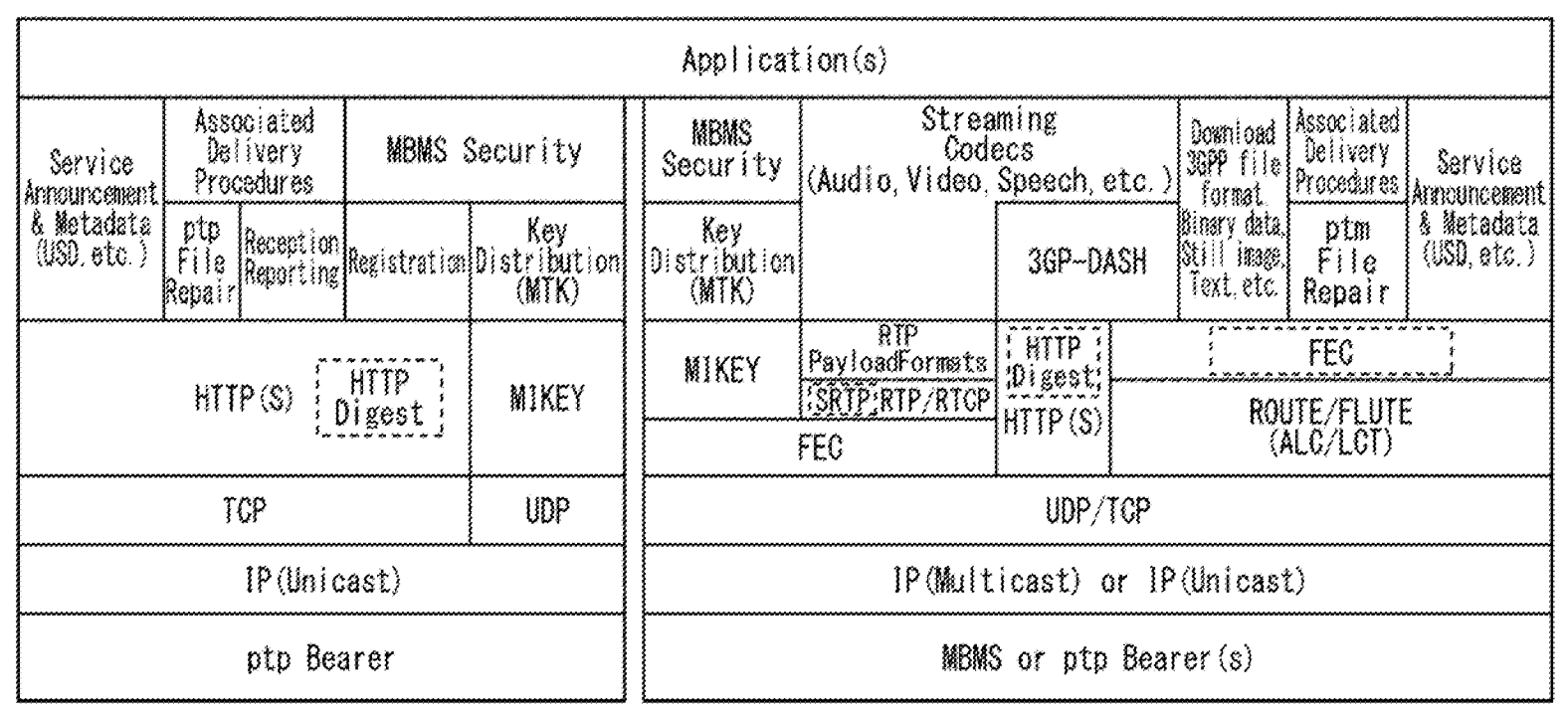

In the above, the ROUTE that is an extension of the FLUTE has been described. Also in the protocol stacks of the above-described present 3GPP-(e)MBMS (FIG. 1), it is assumed that the ROUTE is specified instead of the FLUTE, or together with the FLUTE, in the future (FIG. 9). In the following description, 3GPP-(e)MBMS is described as 3GPP-MBMS.

<2. System Configuration>

Figure 10:
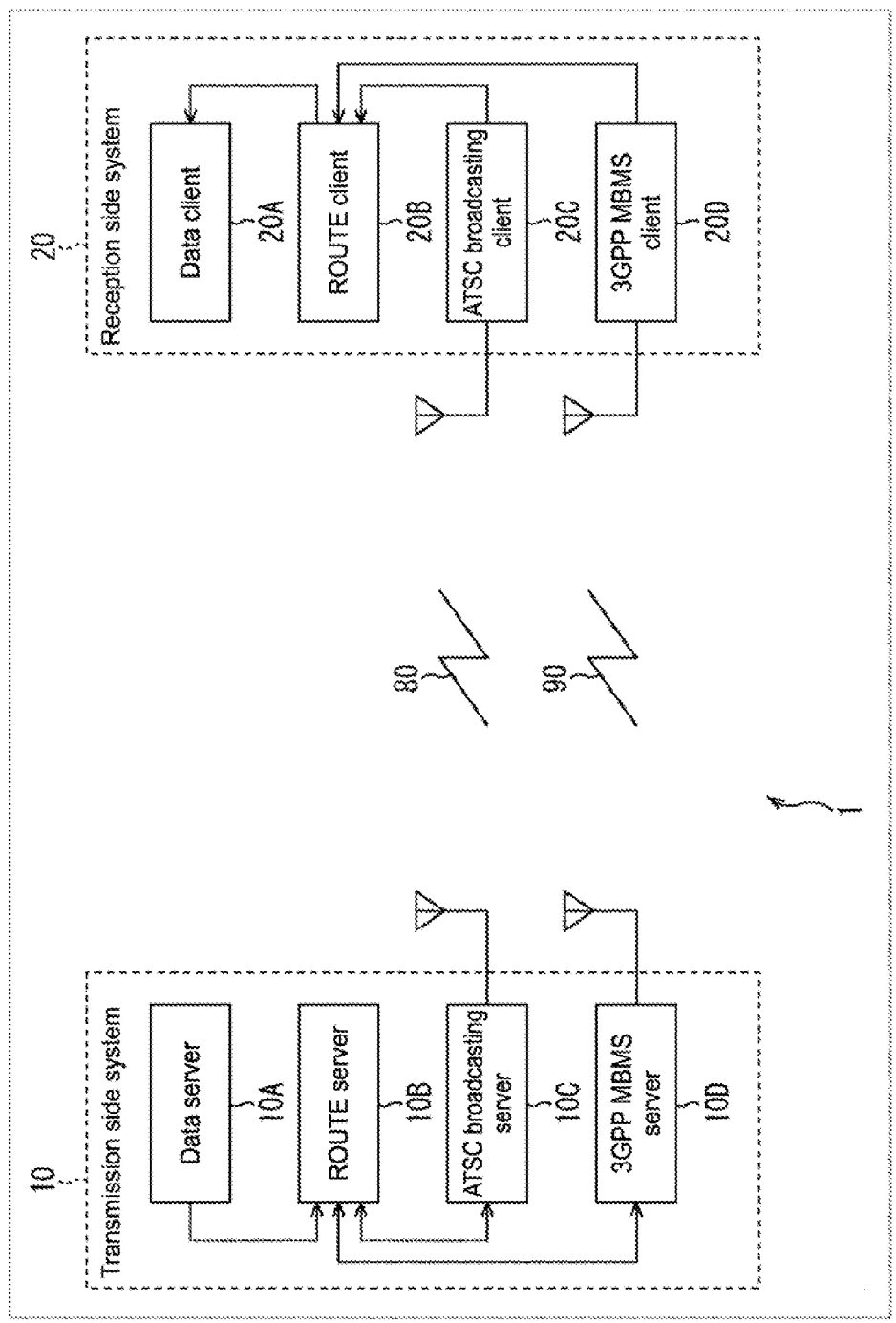
FIG. 10 A diagram showing a configuration example of a transmission system.

FIG. 10 is a diagram showing a configuration example of a transmission system to which the present technology is applied.

In FIG. 10, a transmission system 1 includes a transmission side system 10, and a reception side system 20. In the transmission system 1, data transmitted from the transmission side system 10 is received by the reception side system 20 via a transmission path 80 or a transmission path 90.

The transmission side system 10 corresponds, for example, to a predetermined standard such as ATSC3.0 and 3GPP-MBMS. The transmission side system 10 is configured of a data server 10A, a ROUTE server 10B, an ATSC broadcasting server 100 and a 3GPPMBMS server 10D.

The data server 10A is a server that manages data of contents (for example, simultaneous multi-destination delivery is suitable) delivered from the transmission side system 10 to the reception side system 20. The data server 10A supplies the ROUTE server 10B with the data of contents.

The ROUTE server 10B is a server that performs processing for transmitting the data of contents supplied from the data server 10A through the ROUTE session.

The ROUTE server 10B generates an extended LSID based on information supplied from the ATSC broadcasting server 10C and the 3GPPMBMS server 10D, and supplies the ATSC broadcasting server 10C or the 3GPPMBMS server 10D with the extended LSID. The extended LSID is provided by extending the LSID, a detail of which will be described below by referring to FIG. 15, and the like.

In addition, the ROUTE server 10B processes the data of contents supplied from the data server 10A, generates the data of contents transmitted through the ROUTE session (hereinafter, also referred to as ROUTE data), and supplies the ATSC broadcasting server 10C or the 3GPPMBMS server 10D with the data of contents.

The ATSC broadcasting server 10C is a server that ROUTE data from the ROUTE server 10B is transmitted by a transport bearer corresponding to ATSC3.0.

The ATSC broadcasting server 10C transmits the extended LSID supplied from the ROUTE server 10B to the reception side system 20 (ATSC broadcasting client 20C) via the transmission path 80. In addition, the ATSC broadcasting server 10C performs processing for transmitting ROUTE data supplied from the ROUTE server 10B on the transport bearer of ATSC3.0, and transmits (simultaneous multi-destination delivers) obtained data (hereinafter, also referred to as bearer data) to the reception side system 20 (ATSC broadcasting client 20C) via the transmission path 80.

The 3GPPMBMS server 10D is a server for transmitting the ROUTE data from the ROUTE server 10B by the transport bearer corresponding to 3GPP-MBMS.

The 3GPPMBMS server 10D transmits the extended LSID supplied from the ROUTE server 10B to the reception side system 20 (3GPPMBMS client 20D) via the transmission path 90. In addition, the 3GPPMBMS server 10D performs processing for transmitting the ROUTE data supplied from the ROUTE server 10B on the transport bearer of 3GPPMBMS, and transmits (simultaneous multi-destination delivers) obtained bearer data to the reception side system 20 (3GPPMBMS client 20D) via the transmission path 90.

The reception side system 20 corresponds, for example, to a predetermined standard such as ATSC3.0 and 3GPP-MBMS. The reception side system 20 is configured of a data client 20A, a ROUTE client 20B, an ATSC broadcasting client 20C, and a 3GPPMBMS client 20D.

The 3GPPMBMS client 20D is a client for receiving the transport bearer corresponding to 3GPP-MBMS transmitted from the transmission side system 10.

The 3GPPMBMS client 20D receives the extended LSID supplied from the 3GPPMBMS server 10D via the transmission path 90, and supplies the ROUTE client 20B with the extended LSID. In addition, the 3GPPMBMS client 20D receives and processes the bearer data transmitted (simultaneous multi-destination delivered) from the transmission side system 10 (3GPPMBMS server 10D) via the transmission path 90, and supplies the ROUTE client 20B with the bearer data.

The ATSC broadcasting client 20C is a client for receiving the transport bearer corresponding to ATSC3.0 transmitted from the transmission side system 10.

The ATSC broadcasting client 20C receives the extended LSID supplied from the ATSC broadcasting server 100 via the transmission path 80, and supplies the ROUTE client 20B with the extended LSID. In addition, the ATSC broadcasting client 20C receives and processes the bearer data transmitted (simultaneous multi-destination delivered) from the transmission side system 10 (ATSC broadcasting server 100) via the transmission path 80, and supplies the ROUTE client 20B with the bearer data.

The ROUTE client 20B is a client for processing the ROUTE data transmitted on the transport bearer of ATSC3.0 or 3GPP-MBMS.

The ROUTE client 20B acquires the ROUTE data transmitted on the transport bearer (the bearer data) of ATSC3.0 or 3GPP-MBMS based on the ATSC broadcasting client 20C or 3GPPMBMS client 20D, and supplies the data client 20A with the ROUTE data.

The data client 20A is a client for regenerating data of contents delivered (simultaneous multi-destination delivered) from the transmission side system 10 to the reception side system 20. The data client 20A regenerates the data of contents (for example, simultaneous multi-destination delivery is suitable) supplied from the ROUTE client 20B, and outputs video and sound.

FIG. 10 shows the ATSC broadcasting server 10C and the ATSC broadcasting client 20C corresponding to ATSC3.0, and the 3GPPMBMS server 10D and the 3GPPMBMS client 20D corresponding to 3GPPMBMS, and illustrates the case that the transport bearers corresponding to the standards are processed. Any server and client corresponding to any standards other than ATSC3.0 and 3GPP-MBMS may be provided. For example, when the ROUTE is data transmitted by a transport bearer of DVB (Digital Video Broadcasting)-based IP broadcasting (IP over MPEG2-TS), a DVB broadcasting server corresponding to the DVB transport bearer is added at the transmission side system 10, and a DVB broadcasting client corresponding to the DVB transport bearer is added at the reception side system 20.

In addition, in the transmission system 1 in FIG. 10, only one reception side system 20 is shown as a matter of explanation convenience. Actually, a plurality of (many) reception side systems 20 that can receive the contents simultaneous multi-destination delivered from the transmission side system 10 are disposed. Also, it is assumed that the reception side system 20 may corresponds only to ATSC3.0, not to 3GPP-MBMS, for example. In this case, the 3GPP-MBMS client 20D is excluded from the configuration, the reception side system 20 is configured of the data client 20A, the ROUTE client 20B and the ATSC broadcasting client 20C.

Furthermore, in FIG. 10, it is described that the transmission side system 10 is configured of a plurality of servers including the data server 10A to the 3GPPMBMS server 10D. It may be possible to consider the transmission side system 10 as a transmission apparatus (transmission unit) including all functions of the servers. Similarly, it is described that the reception side system 20 is configured of a plurality of clients including the data client 20A to the 3GPPMBMS client 20D. It may be possible to consider the reception side system 20 as a reception apparatus (reception unit) including all functions of the clients.

<3. Extended LSID to which the Present Technology is Applied>

(1) Outline of LSID (Configuration of ROUTE Session)

Figure 11:
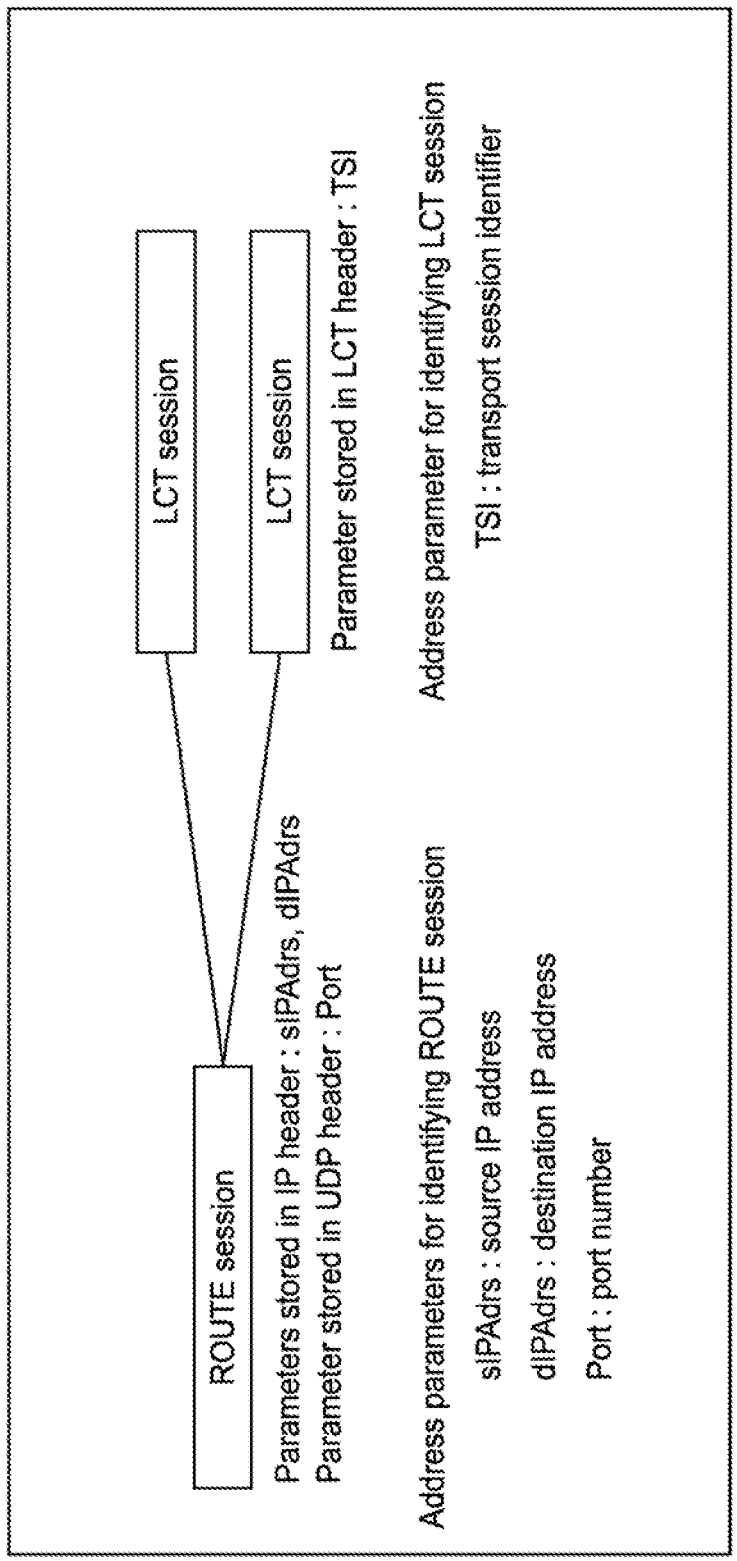
FIG. 11 A diagram showing a configuration of a ROUTE session.

FIG. 11 is a diagram showing a configuration of a ROUTE session.

As shown in FIG. 11, the ROUTE session may be configured of one or a plurality of LCT sessions. The ROUTE session is identified by a source IP address (sIPAdrs) and a destination IP address (dIPAdrs) that are parameters stored in an IP header of the IP packet, and a port number (Port) that is a parameter stored in a UDP header of the UDP packet. The LCT session is identified by a TSI (Transport Session Identifier) of the LCT packet (ALC/LCT packet).

Any signaling information (for example, SLS signaling information) transmitted from the transmission side system 10 (ROUTE server 10B) to the reception side system 20 (ROUTE client 20B) notifies the source IP address, the destination IP address and the port number for identifying the ROUTE session, thereby acquiring the IP/UDP packets transmitted through the ROUTE session.

In the ROUTE session, by filtering the LCT packet where the TSI=0, the LSID that is the control information (control metafile) of the ROUTE protocol can be obtained. Note that the LCT packet where the TSI=0 is filtered to acquire the LSID only when the LSID is transmitted through the ROUTE session.

(Configuration of LSID)

Figure 12:
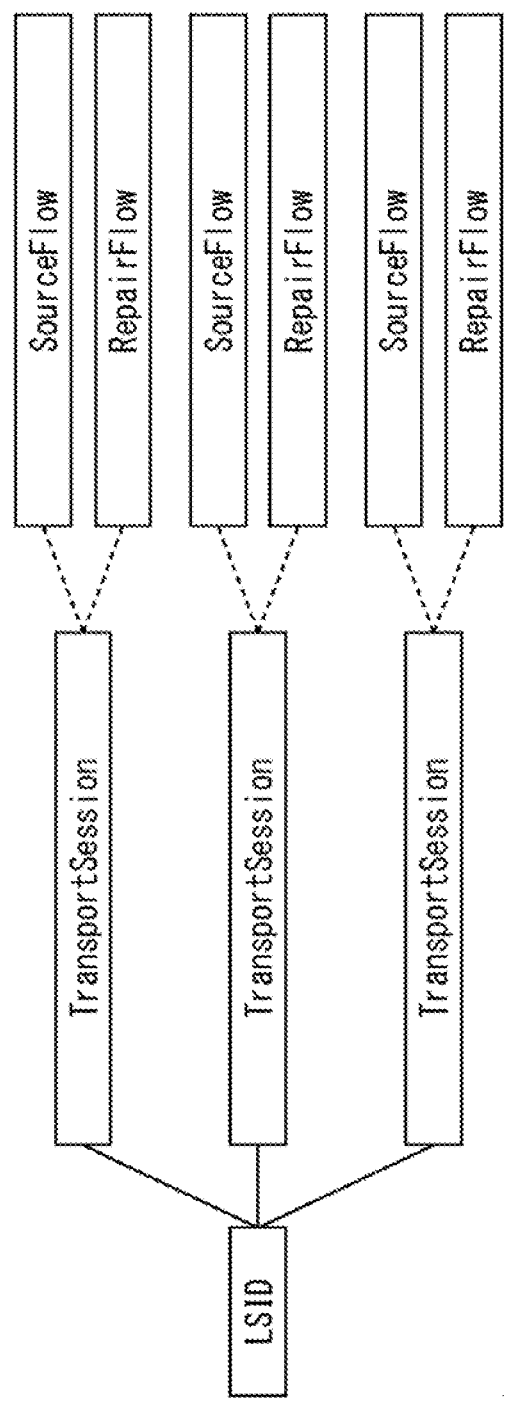
FIG. 12 A diagram showing a configuration of LSID.

FIG. 12 is a diagram showing a configuration of the LSID.

As shown in FIG. 12, a source stream (SourceFlow) and a repair stream (RepairFlow) are described into the LSID per one or a plurality of transport sessions (TransportSession). FIG. 13 shows a detailed description of an LSID element. The TSI that is an identifier of the LCT session is described into the LSID other than the source stream and the repair stream as attributes per LCT session (transport session) configuring the ROUTE session.

(Flow of Data Acquisition using LSID)

Figure 14:
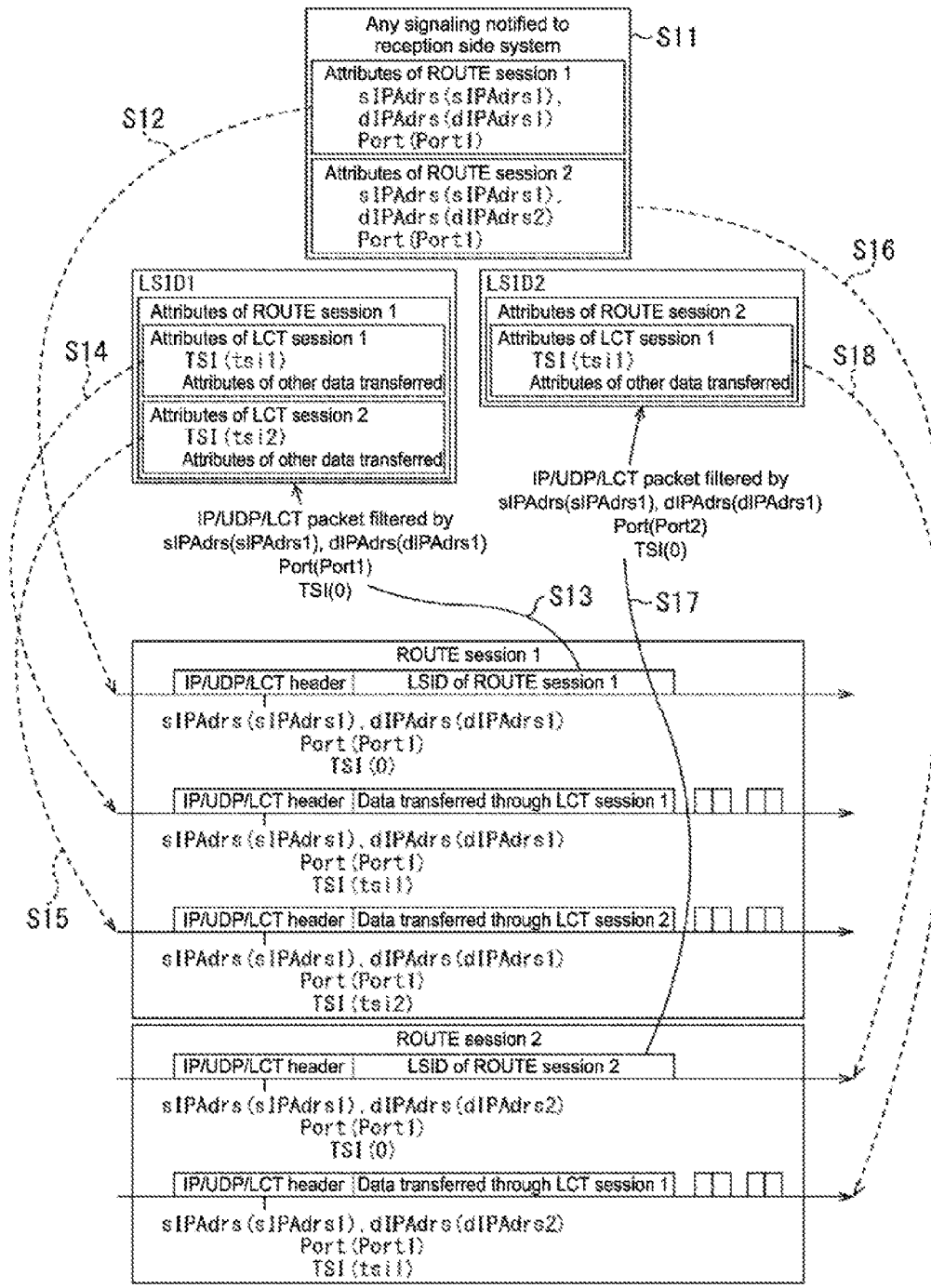
FIG. 14 A drawing explaining a flow of data acquisition using LSID.

FIG. 14 is a drawing explaining a flow of data acquisition using the LSID in the reception side system 20.

In FIG. 14, the reception side system 20 acquires information about the ROUTE session from any signaling information notified from the transmission side system 10 (S11). Information about attributes of a ROUTE session 1 and a ROUTE session 2 in the broadcasting stream transferred (transmitted) from the transmission side system 10 is described into the signaling information.

Here, as the attribute of the ROUTE session 1, the source IP address "sIPAdrs1", the destination IP address "dIPAdrs1", and the port number "Port1" are designated. As the attributes of the ROUTE session 2, the source IP address "sIPAdrs1", the destination IP address "dIPAdrs2", and the port number "Port1" are designated.

The reception side system 20 acquires IP/UDP packets transferred through the ROUTE session 1 identified by the source IP address "sIPAdrs1", the destination IP address "dIPAdrs1", and the port number "Port1" according to the information about the attributes of the ROUTE session 1 in the signaling information (S12). Also, the reception side system 20 filters IP/UDP/LCT packets at the TSI=in the ROUTE session 1, thereby acquiring LSID1 that is the control information of the ROUTE session 1 (S13).

The LSID1 includes the information about the attributes of the LCT session 1 and the LCT session 2 as the attributes of the ROUTE session 1.

Here, as the attributes of the LCT session 1, the TSI "tsi1" is designated. The reception side system 20 acquires data (IP/UDP/LCT packets) transferred through the LCT session 1 of the ROUTE session 1 identified by the source IP address "sIPAdrs1", the destination IP address "dIPAdrs1", the port number "Port1", and the TSI "tsi1" according to the information about the attributes of the LCT session 1 in the LSID1 (S14).

As the attributes of the LCT session 2, the TSI "tsi2" is designated. The reception side system 20 acquires data (IP/UDP/LCT packets) transferred through the LCT session 2 of the ROUTE session 1 identified by the source IP address "sIPAdrs1", the destination IP address "dTPAdrs1", the port number "Port1", and the TSI "tsi2" according to the information about the attributes of the LCT session 2 in the LSID1 (S15).

On the other hand, in the signaling information, as the attributes of the ROUTE session 2, the source IP address "sIPAdrs1", the destination IP address "dIPAdrs2", and the port number "Port1" are designated. The reception side system 20 processes the ROUTE session 2 similar to the above-described ROUTE session 1.

Specifically, the reception side system 20 acquires IP/UDP packets transferred through the ROUTE session 2 identified by the source IP address "sIPAdrs1", the destination IP address "dIPAdrs2", and the port number "Port1" according to the information about the attributes of the ROUTE session 2 in the signaling information (S16). Also, the reception side system 20 filters IP/UDP/LCT packets at the TSI=in the ROUTE session 2, thereby acquiring LSID2 that is the control information of the ROUTE session 2 (S17).

The LSID2 includes the information about the attributes of LCT session 1 as the attributes of the ROUTE session 2.

Here, as the attributes of the LCT session 1, the TSI "tsi1" is designated. The reception side system 20 acquires data (IP/UDP/LCT packets) transferred through the LCT session 1 of the ROUTE session 2 identified by the source IP address "sIPAdrs1", the destination IP address "dIPAdrs2", the port number "Port1", and the TSI "tsi1" according to the information about the attributes of the LCT session 1 in the LSID2 (S18).

As described above, the reception side system 20 acquires the LSID transmitted through the ROUTE session after any signaling information is acquired, uses the TSI described in the LSID, and can acquire data transmitted through the LCT session of the ROUTE session.

(2) Extended LSID

In the processing using the above-described LSID, in order to acquire the data transmitted through the LCT session of the ROUTE session, it is necessary to acquire any signaling information, and to acquire the LSID transmitted through the ROUTE session, and it is therefore a request that the processing is simplified.

For the request, the LSID is extended to include the source IP address, the destination IP address, and the port number. In other words, the source IP address, the destination IP address, and the port number are included in the LSID, whereby processing to acquire data transmitted through the LCT session of the ROUTE session is simplified.

Note that the source IP address is an option whether or not the source IP address is included in the extending LSID. In the present application, the extending LSID is referred to as the extended LSID in order to differentiate from the LSID already specified.

(Flow of Data Acquisition using Extended LSID)

Figure 15:
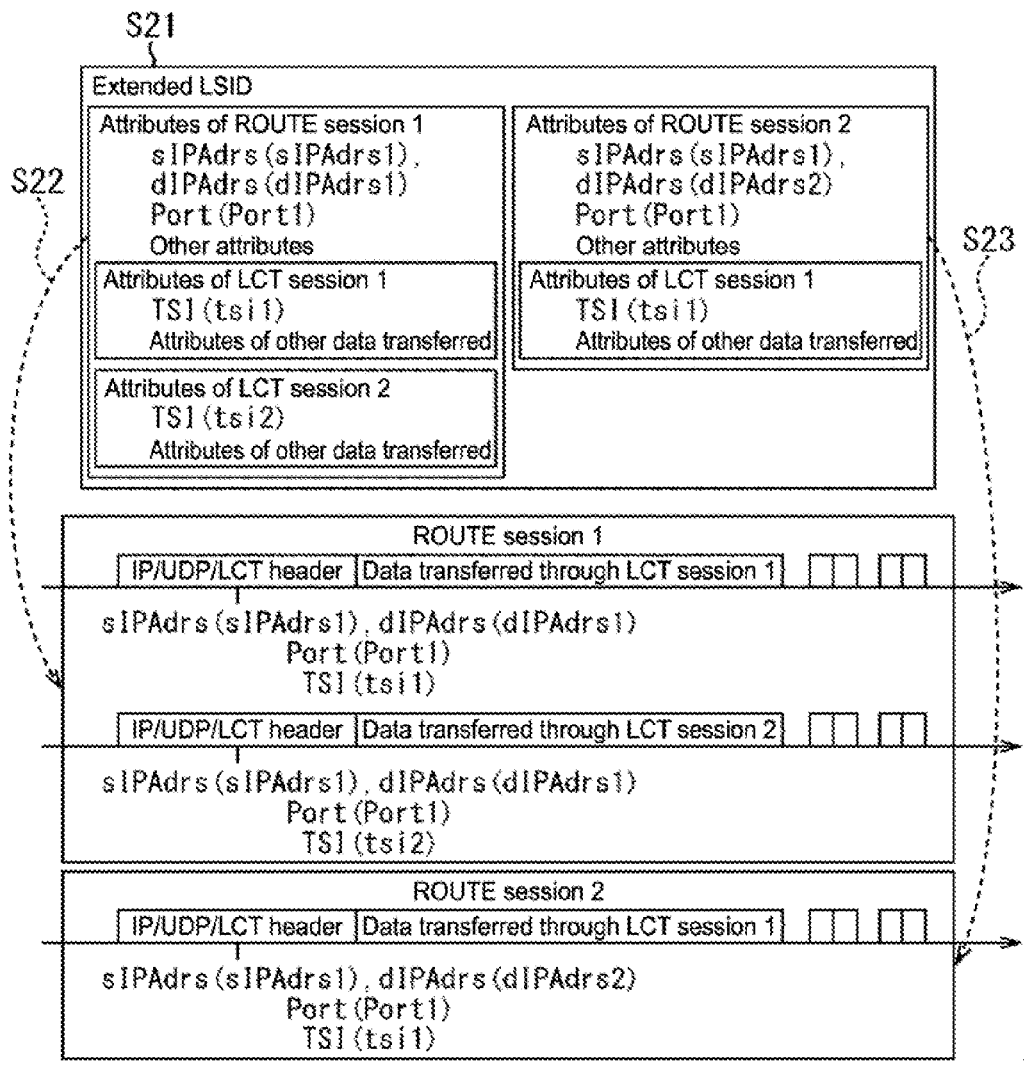
FIG. 15 A drawing explaining a flow of data acquisition using an extended LSID.

FIG. 15 is a drawing explaining a flow of data acquisition using the extended LSID.

In FIG. 15, the reception side system 20 acquires the extended LSID notified from the transmission side system 10 as SLS signaling information (S21), for example. Information about attributes of the ROUTE session 1 and the ROUTE session 2 in the broadcasting stream transferred (transmitted) from the transmission side system 10 is described in the extended LSID.

Here, as the attribute of the ROUTE session 1, the source IP address "sIPAdrs1", the destination IP address "dIPAdrs1", and the port number "Port1" are designated. The attributes of the ROUTE session 1 include the information about the attributes of the LCT session 1 and the LCT session 2.

Specifically, in the attribute of the ROUTE session 1, TSI "tsi1" is designated in the attribute of the LCT session 1, and TSI "tsi2" is designated in the attribute of the LCT session 2.

Thus, the reception side system 20 can acquire data (IP/UDP/LCT packets) transferred through the LCT session 1 of the ROUTE session 1 identified by the source IP address "sIPAdrs1", the destination IP address "dIPAdrs1", the port number "Port1", and TSI "tsi1" according to the information about the attribute of the ROUTE session 1 in the extended LSID (the attribute of the LCT session 1) (S22).

Similarly, the reception side system 20 can acquire data (IP/UDP/LCT packets) transferred through the LCT session 2 of the ROUTE session 1 identified by the source IP address "sIPAdrs1", the destination IP address "dIPAdrs1", the port number "Port1", and TSI "tsi2" according to the information about the attribute of the ROUTE session 1 in the extended LSID (the attribute of the LCT session 2).

On the other hand, in the extended LSID, as the attribute of the ROUTE session 2, the source IP address "sIPAdrs1", the destination IP address "dIPAdrs2", and the port number "Port1" are designated. In the attribute of the ROUTE session 2, as the attribute of the LCT session 1, TSI "tsi1" is designated. The reception side system 20 processes the ROUTE session 2 similar to the ROUTE session 1 as described above.

That is to say, the reception side system 20 can acquire data (IP/UDP/LCT packets) transferred through the LCT session 1 of the ROUTE session 2 identified by the source IP address "sIPAdrs1", the destination IP address "dIPAdrs1", the port number "Port1", and TSI "tsi1" according to the information about the attribute of the ROUTE session 2 in the extended LSID (the attribute of the LCT session 1) (S23).

Although it is described that the attributes of one or a plurality of LCT sessions are defined in the attributes of the ROUTE session in the extended LSID in FIG. 15, the structure of the extended LSID in FIG. 15 is an example, and other structure may be employed.

For example, as shown FIG. 16, the source IP address, the destination IP address, and the port number may be defined together with the TSI in the attribute of the LCT session without defining the attribute of the ROUTE session. Even if the extended LSID is used, the reception side system 20 can specify one or a plurality of LCT sessions configuring the ROUTE session.

As described above, the extended LSID includes the source IP address, the destination IP address, and the port number, and can specify the LCT session using only the extended LSID per ROUTE session. As compared with the LSID, it is unnecessary to acquire the LSID transmitted through the ROUTE session, thereby simplifying processing concerning the signaling information. As a result, the processing to acquire the data transmitted through the LCT session of the ROUTE session is simplified.

(3) Transport Bearer Identification by Extended LSID

By the way, when the ROUTE session is transmitted on various transport bearers such as ATSC3.0, 3GPP-MBMS and the like, information for mapping to each transport bearer will be necessary. Next, a method of mapping the ROUTE session (one or a plurality of LCT sessions configuring the ROUTE session) to various transport bearers by extending the LSID.

The transport bearer corresponds, for example, to a physical layer (Broadcast PHY) in the protocol stack of ATSC3.0 in FIG. 2, or a physical layer (MBMS or ptp Bearer(s)) in the protocol stack of 3GPP-MBMS in FIG. 9.

Here, as transport media, there are ATSC3.0 transport, 3GPP-MBMS transport, DVB-based IP broadcasting transport, for example. The transport media have different modulation parameters and encoding parameters, and become transport pipes having different transfer qualities.

In the extended LSID, as an attribute of each LCT session, an identifier for identifying the transport bearer (hereinafter referred to as an transport bearer ID (BearerID)) is described, whereby mapping the ROUTE session (the LCT session) and the transport bearer. A format of the transport bearer ID is defined per targeted transport media.

(Flow of Data Acquisition using Extended LSID)

Figure 17:
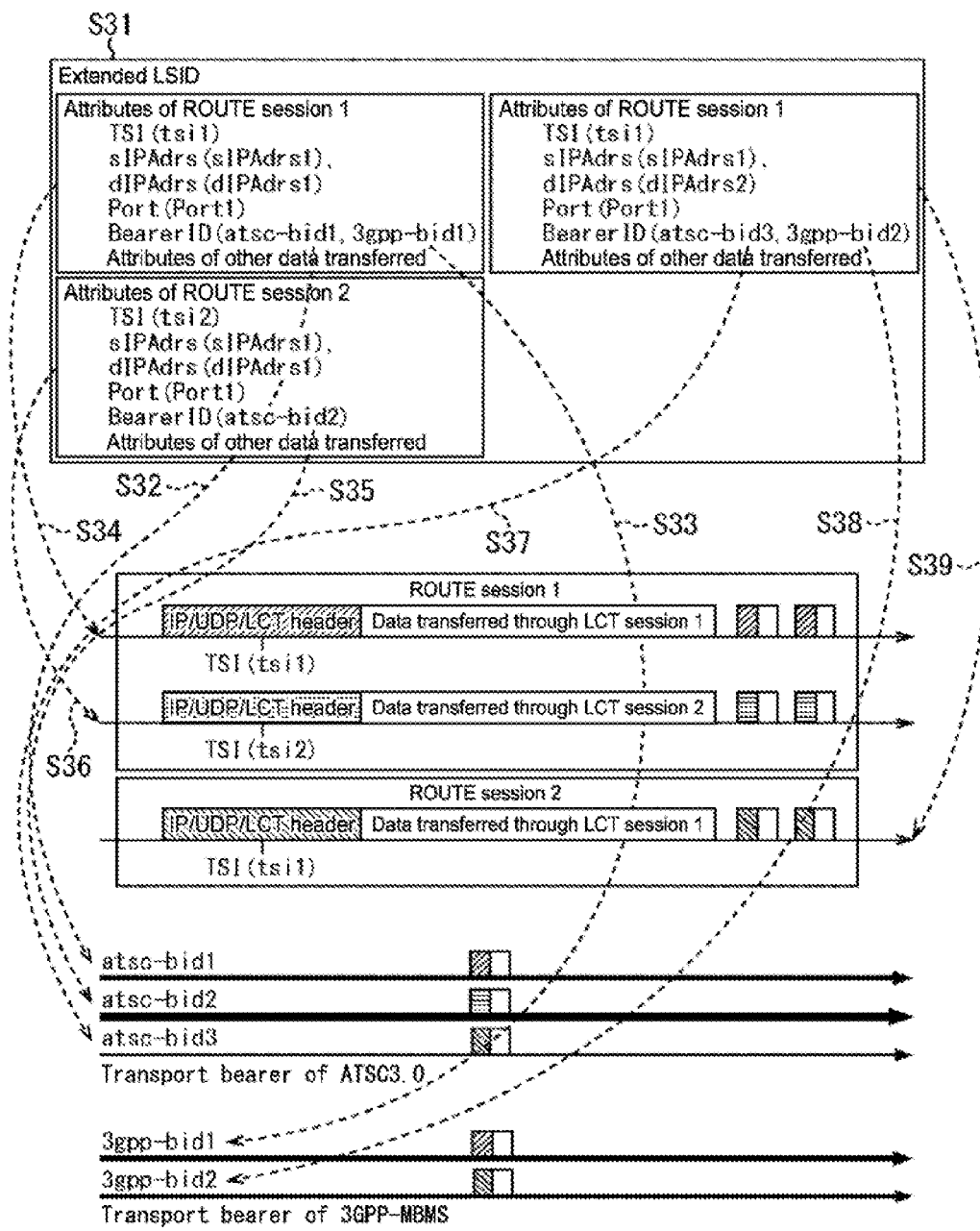
FIG. 17 A diagram explaining a flow of data acquisition using an extended LSID into which a transport bearer ID is described.

FIG. 17 is a diagram explaining a flow of data acquisition using the extended LSID into which the transport bearer ID is described in the reception side system 20.

In FIG. 17, the reception side system 20 acquires the extended LSID notified from the transmission side system 10 as the SLS signaling information (S31). Information about attributes of the LCT session 1 and the LCT session 2 of the ROUTE session 1 and the LCT session 1 of the ROUTE session 2 in the broadcasting stream transferred (transmitted) from the transmission side system 10 is described in the extended LSID.

Here, as the attribute of the LCT session 1 of the ROUTE session 1, the TSI "tsi1", the source IP address "sIPAdrs1", the destination IP address "dIPAdrs1", and the port number "Port1" are designated. In the attribute of the LCT session 1, "atsc-bid1" and "3gpp-bid1" are designated as the transport bearer ID (BearerID)) for identifying the transport bearer.

"atsc-bidX" (X is an integer of 1 or more) is the transport bearer ID for identifying the transport bearer of ATSC3.0. In the case of the transport bearer of ATSC3.0, a combination of a Broadcast Stream ID and PLPID (Physical Layer Pipe ID) is the transport bearer ID.

Here, a broadcast stream ID is assigned to a set of an area ID that is an identifier assigned per reach area of a broadcast wave and a frequency ID that is an identifier of a frequency band assigned to a broadcast wave of a certain channel. PLPID is an identifier per physical pipe when a frequency band identified by the broadcast stream ID is divided further into a plurality of physical layer pipes (PLPs) having different modulation parameters and encoding parameters.

"3gpp-bidX" (X is an integer of 1 or more) is the transport bearer ID for identifying the transport bearer of 3GPP-MBMS. In the case of the transport bearer of 3GPP-MBMS, TMGI (Temporary Mobile Group Identity) is the transport bearer ID.

Although not shown, in the case of the DVB-based IP broadcasting transport bearer, a DVB triplet that is a combination of an original network ID (ONID), a transport ID (TID), and a service ID (SID) is the transport bearer ID. A packet ID (PID) of MPEG2 may be further combined with the transport bearer ID.

Thus, the reception side system 20 can be connected to the transport bearer of ATSC3.0 identified by the transport bearer ID "atsc-bid1" according to the information about the attribute of the LCT session 1 in the extended LSID (S32). Similarly, the reception side system 20 can be connected to the transport bearer of 3GPP-MBMS identified by the transport bearer ID "3gpp-bid1" according to the information about the attribute of the LCT session 1 in the extended LSID (S33).

Then, the reception side system 20 can acquire data (IP/UDP/LCT packets) transferred through the LCT session 1 of the ROUTE session 1 identified by the source IP address "sIPAdrs1", the destination IP address "dIPAdrs1", the port number "Port1", and TSI "tsi1" according to the information about the attribute of the LCT session 1 in the extended LSID (S34). It should be noted that the LCT session 1 of the ROUTE session 1 is transmitted on the transport bearer of ATSC3.0 or the transport bearer of 3GPP-MBMS identified by the transport bearer ID "atsc-bid1" or "3gpp-bid1" (S32, S33).

In addition, in FIG. 17, in the extended LSID, as the attribute of the LCT session 2 of the ROUTE session 1, the TSI "tsi2", the source IP address "sIPAdrs1", and the destination IP address "dIPAdrs1", and the port number "Port1" are designated. In the attribute of the ROUTE session 2, as the transport bearer ID for identifying the transport bearer, "atsc-bid2" is designated.

The reception side system 20 can be connected to the transport bearer of ATSC3.0 identified by the transport bearer ID "atsc-bid2" according to the information about the attribute of the LCT session 2 in the extended LSID (S35).

Then, the reception side system 20 can acquire data (IP/UDP/LCT packets) transferred through the LCT session 2 of the ROUTE session 1 identified by the source IP address "sIPAdrs1", the destination IP address "dIPAdrs1", the port number "Port1", and TSI "tsi2" according to the information about the attribute of the LCT session 2 in the extended LSID (S36). It should be noted that the LCT session 2 of the ROUTE session 1 is transmitted on the transport bearer of ATSC3.0 identified by the transport bearer ID "atsc-bid1" (S35).

In addition, in FIG. 17, in the extended LSID, as the attribute of the LCT session 1 of the ROUTE session 2, the TSI "tsi1", the source IP address "sIPAdrs1", and the destination IP address "dIPAdrs1", and the port number "Port1" are designated. In the attribute of the LCT session 1, as the transport bearer ID for identifying the transport bearer, "atsc-bid3" and "3gpp-bid2" are designated.

The reception side system 20 can be connected to the transport bearer of ATSC3.0 identified by the transport bearer ID "atsc-bid3" according to the information about the attribute of the LCT session 1 in the extended LSID (S37). Similarly, the reception side system 20 can be connected to the transport bearer of 3GPP-MBMS identified by the transport bearer ID "3gpp-bid2" according to the information about the attribute of the LCT session 1 in the extended LSID (S38).

Then, the reception side system 20 can acquire data (IP/UDP/LCT packets) transferred through the LCT session 1 of the ROUTE session 2 identified by the source IP address "sIPAdrs1", the destination IP address "dIPAdrs2", the port number "Port1", and TSI "tsi1" according to the information about the attributes of the LCT session 1 in the extended LSID (S39). It should be noted that the LCT session 1 of the ROUTE session 2 is transmitted on the transport bearer of ATSC3.0 or the transport bearer of 3GPP-MBMS identified by the transport bearer ID "atsc-bid3" or "3gpp-bid2" (S37, S38).

As described above, the transport bearer ID is described into the attributes of each LCT session of the extended LSID, whereby the ROUTE session (the LCT session) and the transport bearer are mapped, and the transport bearer transmitted by a plurality of the transmission systems such as ATSC3.0 and 3GPP-MBMS can be appropriately selected.

(Example of Extended LSID Structure)

Next, referring to FIG. 18 to FIG. 21, illustrative structure and description of the extended LSID will be described.

(First Structure)

FIG. 18 is a diagram showing a first structure of the extended LSID in an XML format.

Note that in FIG. 18, for simplifying the description, elements and attributes of the extended LSID that are overlapped with those of the LSID in FIG. 13 and that not directly relate to the present technology are omitted for description. Also in FIG. 18, "@" marks are attached to the attributes but are not attached to the elements. Indented elements and attributes are described for upper elements. These relationships are similar to those of other LSID structure described later.

In FIG. 18, the LSID element as a route element is an upper element of a TransportSession element. In the TransportSession element, information about the transport session is designated.

The TransportSession element is an upper element of a tsi attribute, a BroadcastStreamID attribute, a PLPID attribute, a TMGI attribute, a DVBTriplet-pid attribute, a sourceIPAddress attribute, a destinationIPAddress attribute, a port attribute, and a SourceFlow element.

The TSI for identifying the LCT session is designated in the tsi attribute as an attribute value.

The broadcast stream ID specified by ATSC3.0 is designated in the BroadcastStreamID attribute as an attribute value. The PLPID is designated by ATSC3.0 is specified in the PLPID attribute as an attribute value. Note that the BroadcastStreamID attribute and the PLPID attribute are optional attributes when the transport bearer of ATSC3.0 is transmitted.

The TMGI specified by 3GPP-MBMS is designated in the TMGI attribute as an attribute value. Note that the TMGI attribute is an optional attribute when the transport bearer of 3GPP-MBMS is transmitted.

A set of the DVB triplet that is a combination of the original network ID, the transport ID, and the service ID and the packet ID is designated in the DVBTriplet-pid attribute. Note that the DVBTriplet-pid attribute is an optional attribute when the DVB-based IP broadcasting transport bearer is transmitted.

The source IP address is designated in the sourceIPAddress attribute as an attribute value. The destination IP address is designated in the destinationIPAddress attribute as an attribute value. The port number is designated in the port attribute as an attribute value. Note that the sourceIPAddress attribute, the destinationIPAddress attribute, and the port attribute are optional attributes.

Information about a source flow is designated in the SourceFlow element as an attribute value. Note that the SourceFlow element is an optional attribute.

Here, referring to FIG. 19, a specific description example of the first structure of an extended LSID defined in FIG. 18 will be described. FIG. 19 shows the extended LSID when the transport bearers of ATSC3.0, 3GPP-MBMS, and DVB-based IP broadcasting are transmitted.

In FIG. 19, the transport bearers of ATSC3.0, 3GPP-MBMS, and DVB-based IP broadcasting are transmitted to the TransportSession element. The BroadcastStreamID attribute, the PLPID attribute, the TMGI attribute, and the DVBTriplet-pid attribute are described among optional attributes other than the tsi attribute.

"xxx" is designated in the tsi attribute as a value of TSI.

"yyy" is designated in the BroadcastStreamID attribute as the broadcast stream ID. In addition, "zzz" is designated in the PLPID attribute as a PLPID. That is to say, a combination of the broadcast stream ID "yyy" and the PLPID "zzz" sets the transport bearer ID for identifying the transport bearer of ATSC3.0.

"www" is designated in the TMGI attribute as TMGI. That is to say, the TMGI "www" sets the transport bearer ID for identifying the transport bearer of 3GPP-MBMS.

As the original network ID "onidX", as the transport ID "tsidX", as the service ID "sidX", and as the packet ID "pidX" are designated in the DVBTriplet-pid attribute. That is to say, a combination of the original network ID "onidX", the transport ID "tsidX", the service ID "sidX", and the packet ID "pidX" sets the transport bearer ID for identifying the DVB-based IP broadcasting transport bearer.

In the above, the first structure of the extended LSID in the XML format has been described.

(Second Structure)

FIG. 20 is a diagram showing a second structure of an extended LSID in an XML format.

The second structure of the extended LSID shown in FIG. 20 defines a type of the element per transport media, which is independent as an XXXBearerID element by structuring the identifier per the transport media as compared with the first structure of the above-described extended LSID.

In FIG. 20, the LSID element as a route element is an upper element of a TransportSession element. Here, the TransportSession element is an upper element of a tsi attribute, a sourceIP address attribute, a destinationIPAddress attribute, a port attribute, and a SourceFlow element and is also an upper element of an ATSCBearerID element, a 3GPPBearerID element, and a DVBTSBearerID element.

The ATSCBearerID element is an upper element of the BroadcastStreamID attribute where the broadcasting stream ID is designated and of the PLPID attribute where the PLPID is designated. Specifically, the ATSCBearerID element stores a set of the broadcasting stream ID and the PLPID. Note that the ATSCBearerID element is an optional attribute when the transport bearer of ATSC3.0 is transmitted.

The 3GPPBearerID element is an upper element of the TMGI attribute where the TMGI is designated. Specifically, the 3GPPBearerID element stores the TMGI. Note that the 3GPPBearerID element is an optional attribute when the transport bearer of 3GPP-MBMS is transmitted.

The DVBTSBearerID element is an upper element of the DVBTriplet-pid attribute where the DVB triplet is specified and of the pid attribute where the packet ID is specified. Specifically, the DVBTSBearerID element stores a set of the DVB triplet and the packet ID. Note that the DVBTSBearerID element is an optional attribute when the transport bearer of the DVB-based IP broadcasting is transmitted.

Here, referring to FIG. 21, a specific description example of the second structure of the extended LSID defined in FIG. 20 will be described. FIG. 21 shows the extended LSID when the transport bearers of ATSC3.0, 3GPP-MBMS, and the DVB-based IP broadcasting are transmitted.

In FIG. 21, as the transport bearers of ATSC3.0, 3GPP-MBMS, and DVB-based IP broadcasting are transmitted to the TransportSession element, the ATSCBearerID element, the 3GPPBearerID element, and the DVBTSBearerID element are described among optional attributes.

In the ATSCBearerID element, "yyy" is designated in the BroadcastStreamID attribute as the broadcast stream ID, and "zzz" is designated in the PLPID attribute as a PLPID. That is to say, a combination of the broadcast stream ID "yyy" and the PLPID "zzz" sets the transport bearer ID for identifying the transport bearer of ATSC3.0.

In the 3GPPBearerID element, "www" is designated in the TMGI attribute as TMGI. That is to say, the TMGI "www" sets the transport bearer ID for identifying the transport bearer of 3GPP-MBMS.

In the DVBTSBearerID element, as the original network ID "onidX", as the transport ID "tsidX", as the service ID "sidX", and as the packet ID "pidX" are designated in the DVBTriplet-pid attribute. That is to say, a combination of the original network ID "onidX", the transport ID "tsidX", the service ID "sidX", and the packet ID "pidX" sets the transport bearer ID for identifying the DVB-based IP broadcasting transport bearer.

In the above, the second structure of the extended LSID in the XML format has been described.

The structure of the extended LSID shown in FIG. 18 and FIG. 20 is an example, and other structure may be employed. Although it is described that an XML format is employed as a description format of the extended LSID, it may be a text format by a markup language or a binary format other than the MXL format.

<4. Specific Application Example of System>

Figure 22:
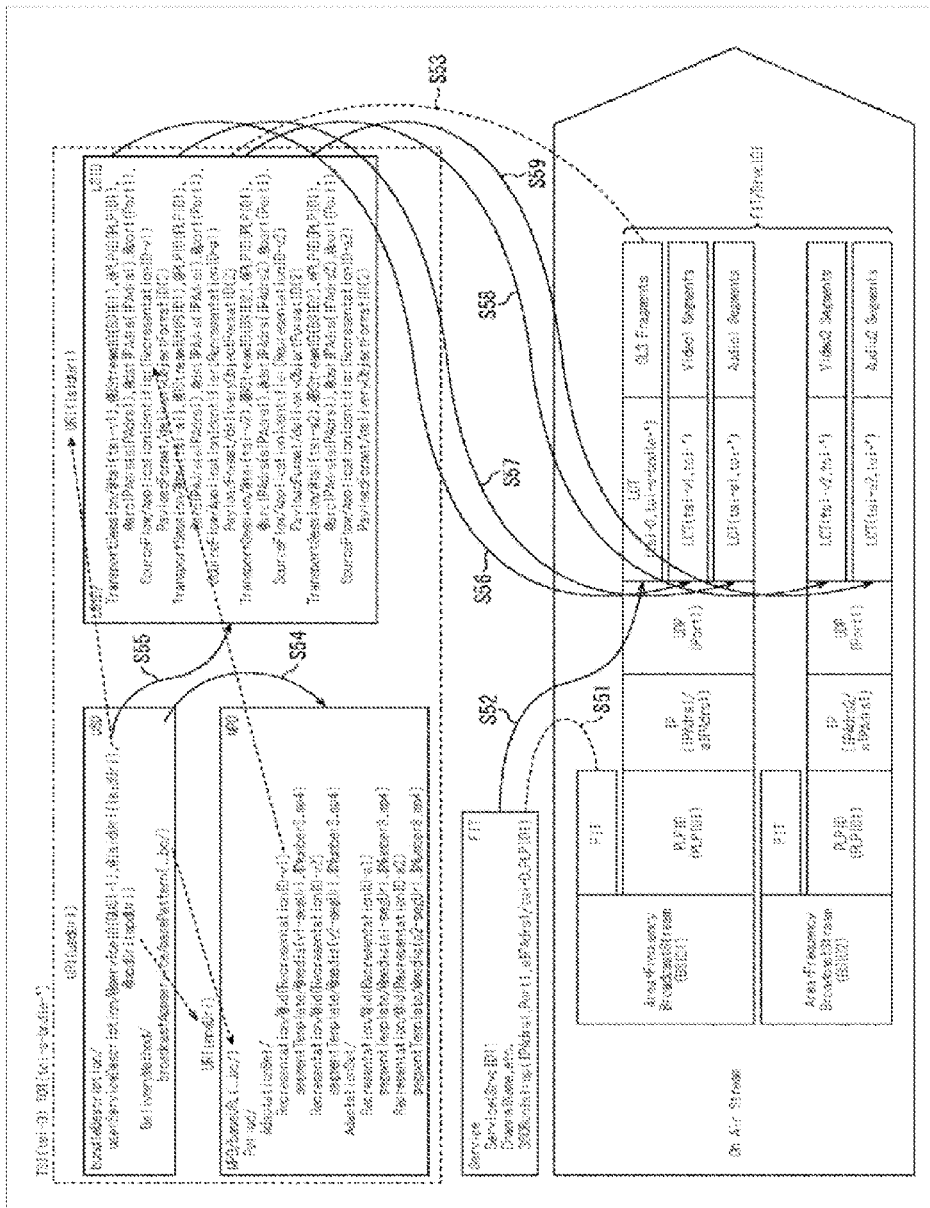
FIG. 22 A diagram showing a specific application example of a reception side system that processes broadcasting stream transmitted from a reception side system.

FIG. 22 is a diagram showing a specific application example of the reception side system 20 that processes the broadcasting stream transmitted from the reception side system 10. The application example in FIG. 22 illustrates the case that a plurality of LCT sessions configuring a plurality of ROUTE sessions are transmitted from the transport bearer of ATSC3.0.

In FIG. 22, as an on air broadcasting stream (On Air Stream), two broadcast waves identified by the broadcasting stream ID are transmitted. The broadcasting stream ID is assigned to a set of the area ID and the frequency ID.

On the broadcasting stream identified by the broadcasting stream ID "BSID1", a physical pipe of the FIT as the LLS signaling information and the PLPID "PLPID1" are transmitted. On the physical pipe, the IP header storing the IP address "IPAdrs1", and the packets to which the UDP header storing the port number "Port1" is added are transmitted. To the payload of the packets, the LCT packets including the LCT header storing the TSI "tsi-0" and the LCT payload storing the SLSsignaling information are provided. As the LCT packets, the LCT packets including the LCT header storing the TSI "tsi-v1" and the LCT payload storing the data of video 1, and the LCT packets including the LCT header storing the TSI "tsi-a1" and the LCT payload that store the data of audio 1 are provided.

On the other hand, on the broadcasting stream identified by the broadcasting stream ID "BSID2", a physical pipe of the FIT as the LLS signaling information and the PLPID "PLPID1" are transmitted. On the physical pipe, the IP header storing the IP address "IPAdrs2", and the packets to which the UDP header storing the port number "Port1" is added are transmitted. To the payload of the packets, the LCT packets including the LCT header storing the TSI "tsi-v2" and the LCT payload storing the data of video 2, and the LCT packets including the LCT header storing the TSI "tsi-a2" and the LCT payload that store the data of audio 2 are provided.

The reception side system 20 that receives the broadcasting stream performs the following processing.

The reception side system 20 acquires the FIT transmitted by the broadcasting stream identified by the broadcasting stream ID "BSID1" (S51). Bootstrap information for acquiring the SLS signaling information per service is described in the FIT. The bootstrap information is a set of the IP address, the port number, the TSI, and the PLPID for acquiring the SLS signaling information transmitted through the ROUTE session.

The reception side system 20 acquires the SLS signaling information transmitted through the ROUTE session based on the bootstrap information (S52, S53). The SLS signaling information acquired in this way includes metadata such as USD (User Service Description), MPD (Media Presentation Description), LSID (extended LSID). In the USD, a reference source such as the MPD and the LSID is described. By acquiring the USD first, other metadata can be acquired.

The reception side system 20 acquires the MPD based on "mpdUri" specified in a mpdUri attribute of a userServiceDescription element in the USD (S54). In addition, the reception side system 20 acquires the LSID (extended LSID) based on "lsidUri" specified in a userServiceDescription element of an lsidUri attribute in the USD (S55).

Here, a Period element, an AdaptationSet element, and a Representation element are described in the MPD in a hierarchical structure. The Period element is a unit for describing the service configuration such as the contents. The AdaptationSet element and the Representation element are utilized per stream such as video, audio and a caption, and can describe the attributes of the respective streams.

The Representation element can designate a representation ID by an id attribute. In the MPD, to a Representation element identified by the representation ID "RepresentationID-v1", an attribute relating to a stream of the video 1 is described, to a Representation element identified by the representation ID "RepresentationID-v2", an attribute relating to a stream of the video 2 is described.

In addition, in the MPD, to a Representation element identified by the representation ID "RepresentationID-a1", an attribute relating to a stream of the audio 1 is described, to a Representation element identified by the representation ID "RepresentationID-a2", an attribute relating to a stream of the audio 2 is described. When the URL specified by the Representation element in the MPD is matched with the URL specified by the DeliveryMethod element in the USD, a delivery path of the video or audio stream is specified as a broadcasting path or a communication path.

In the LSID (extended LSID), the tsi attribute, the BroadcastStreamID attribute, the PLPID attribute, the sourceIPAddress attribute, the destinationIPAddress attribute, and the port attribute are described per TransportSession element. In the SourceFlow element, the representation ID is specified as the Applicationidentifier element. Specifically, the representation ID shows a correspondence between the Representation element of the MPD and the transport session of the LSID (extended LSID).

Among the TransportSession elements enumerated in the LSID (extended LSID), in the first TransportSession element, the broadcasting stream ID "BSID1" and the PLPID "PLPID1" are specified, whereby the reception side system 20 can connect to the transport bearer of AISC3.0 identified by the transport bearer ID (S56). Also, in the first TransportSession element, the source IP address "sIPArs1", the destination IP address "IPArs1", the port number "Port1", and the TSI "tsi-v1" are specified. Accordingly, by filtering using these parameters, the reception side system 20 can acquire the data of the video 1 (a chunked file of the DASH segment file of the video 1) transmitted through the LCT session of the ROUTE session (S56).

In the second TransportSession element, the broadcasting stream ID "BSID1" and the PLPID "PLPID1" are specified, whereby the reception side system 20 can connect to the transport bearer of ATSC3.0 identified by the transport bearer ID (S57). Also, in the second TransportSession element, the source IP address "sIPArs1", the destination IP address "IPArs1", the port number "Port1", and the TSI "tsi-a1" are specified. Accordingly, by filtering using these parameters, the reception side system 20 can acquire the data of the audio 1 (a chunked file of the DASH segment file of the audio 1) transmitted through the LCT session of the ROUTE session (S57).

In the third TransportSession element, the broadcasting stream ID "BSID2" and the PLPID "PLPID1" are specified, whereby the reception side system 20 can connect to the transport bearer of ATSC3.0 identified by the transport bearer ID (S58). Also, in the third TransportSession element, the source IP address "sIPArs1", the destination IP address "IPArs2", the port number "Port1", and the TSI "tsi-v2" are specified. Accordingly, by filtering using these parameters, the reception side system 20 can acquire the data of the video 2 (a chunked file of the DASH segment file of the video 2) transmitted through the LCT session of the ROUTE session (S58).

In the fourth TransportSession element, the broadcasting stream ID "BSID2" and the PLPID "PLPID1" are specified, whereby the reception side system 20 can connect to the transport bearer of ATSC3.0 identified by the transport bearer ID (S59). Also, in the fourth TransportSession element, the source IP address "sIPArs1", the destination IP address "IPArs2", the port number "Port1", and the TSI "tsi-a2" are specified. Accordingly, by filtering using these parameters, the reception side system 20 can acquire the data of the audio 2 (a chunked file of the DASH segment file of the audio 2) transmitted through the LCT session of the ROUTE session (S59).

In the LSID (extended LSID) in FIG. 22, in the SourceFlow element, as a deliveryObjectFormatID element of the PayloadFormat element, "2" is specified. This shows that the format of the LCT payload is a DASH segment file (chunked) with an HTTP entity header.

<5. Apparatuses Configuration in System>

(Configuration Example of Transmission Side System)

Figure 23:
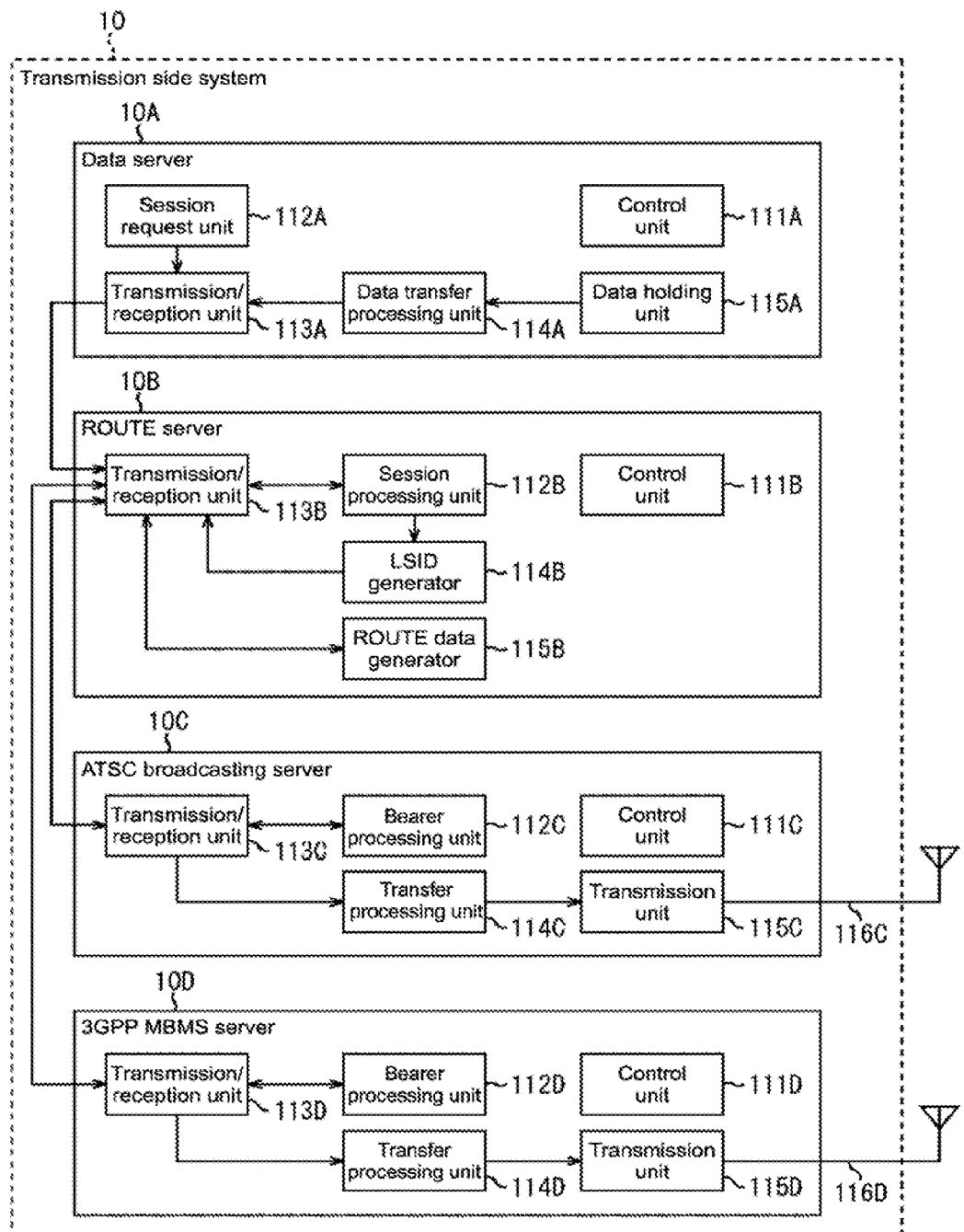
FIG. 23 A diagram showing a configuration example of a transmission side system.

FIG. 23 is a diagram showing a configuration example of the transmission side system 10 in FIG. 10.

The transmission side system 10 is configured of the data server 10A, the ROUTE server 10B, the ATSC broadcasting server 10C and the 3GPPMBMS server 10D.

In FIG. 23, the data server 10A is configured of the control unit 111A, a session request unit 112A, a transmission/reception unit 113A, a data transfer processing unit 114A, and a data holding unit 115A.

The control unit 111A controls operations of each unit of the data server 10A.

When data of contents (for example, contents suitable for the simultaneous multi-destination delivery) is transmitted through the ROUTE session (the LCT session), the session request unit 112A supplies the transmission/reception unit 113A with an establishment request of the ROUTE session to the ROUTE server 10B according to the control by the control unit 111A.

The transmission/reception unit 113A exchanges a variety of data with other servers such as the ROUTE server 105 according to the control by the control unit 111A. The transmission/reception unit 113A transmits the establishment request of the ROUTE session to the ROUTE server 105 according to the control by the control unit 111A.

The data transfer processing unit 114A acquires the data of the contents held in the data holding unit 115A, and supplies it to the transmission/reception unit 113A according to the control by the control unit 111A. The transmission/reception unit 113A transmits the data of the contents to the ROUTE server 10B according to the control by the control unit 111A.

The data server 10A is configured as described above.

In FIG. 23, the ROUTE server 10B is configured of the control unit 111B, a session processing unit 112B, the transmission/reception unit 113B, the LSID generator 114B and the ROUTE data generator 115B.

The control unit 111B controls operations of the respective units of the ROUTE server 10B.

The session processing unit 112B performs processing for transmitting the data of the contents through the ROUTE session according to the control by the control unit 111B.

For example, when the ROUTE data that is the data of the contents transmitted through the ROUTE session is transmitted on the transport bearer of ATSC3.0, the session processing unit 112B supplies the transmission/reception unit 113B with a reservation request of a transport resource of ATSC3.0 to the ATSC broadcasting server 10C. For example, when the ROUTE data is transmitted on the transport bearer of 3GPP-MBMS, the session processing unit 112B supplies the transmission/reception unit 113B with a reservation request of a transport resource of 3GPP-MBMS to the 3GPPMBMS server 10D.

The transmission/reception unit 113B exchanges a variety of data with other servers such as the ATSC broadcasting server 10C or the 3GPPMBMS server 10D according to the control by the control unit 111B. The transmission/reception unit 113B transmits the reservation request of the transport resource of ATSC3.0 or 3GPP-MBMS to the ATSC broadcasting server 10C or the 3GPPMBMS server 10D according to the control by the control unit 111B. The transmission/reception unit 113B receives the transport bearer ID of ATSC3.0 or 3GPP-MBMS transmitted from the ATSC broadcasting server 10C or the 3GPPMBMS server 10D, and supplies it to the session processing unit 112B according to the control by the control unit 111B.

The session processing unit 112B supplies the LSID generator 114B with the transport bearer ID of ATSC3.0 or 3GPP-MBMS supplied from the transmission/reception unit 113B according to the control by the control unit 111B.

The LSID generator 114B generates the transport bearer ID of ATSC3.0 or 3GPP-MBMS supplied from the session processing unit 112B, and the extended LSID based on original data of the extended LSID according to the control by the control unit 111B. Here, for example, the extended LSID in FIG. 19 and FIG. 21 is generated and is supplied to the transmission/reception unit 113B. The transmission/reception unit 113B transmits the ATSC broadcasting server 10C or the 3GPPMBMS server 100 with the extended LSID supplied from the LSID generator 114B according to the control by the control unit 111B.

The transmission/reception unit 113B receives the data of the contents transmitted from the data server 10A, and supplies it to the ROUTE data generator 115B according to the control by the control unit 111B. The ROUTE data generator 115B generates the ROUTE data based on the data of the contents supplied from the transmission/reception unit 113B, and supplies it to the transmission/reception unit 113B according to the control by the control unit 111B. The transmission/reception unit 113B transmits the ROUTE data supplied from the ROUTE data generator 115B to the ATSC broadcasting server 10C or the 3GPPMBMS server 10D according to the control by the control unit 111B.

The ROUTE server 10B is configured as described above.

In FIG. 23, the ATSC broadcasting server 10C is configured of the control unit 111C, a bearer processing unit 112C, the transmission/reception unit 113C, a transfer processing unit 114C and a transmission unit 115C.

The control unit 111C controls operations of the respective units of the ATSC broadcasting server 10C. The transmission/reception unit 113C exchanges a variety of data with other servers such as the ROUTE server 10B according to the control by the control unit 111C.

The transmission/reception unit 113C receives the reservation request of the transport resource of ATSC3.0 transmitted from the ROUTE server 10B, and supplies it to the bearer processing unit 112C. The bearer processing unit 112C ensures the transport resource of ATSC3.0 upon a reservation request supplied from the transmission/reception unit 113C according to the control by the control unit 111C.

The bearer processing unit 112C generates the transport bearer ID of ATSC3.0 upon the reservation request supplied from the transmission/reception unit 113C, and supplies it to the transmission/reception unit 113C according to the control by the control unit 111C. The transmission/reception unit 113C transmits the ROUTE server 10B with the transport bearer ID of ATSC3.0 supplied from the bearer processing unit 112C according to the control by the control unit 111C.

The transmission/reception unit 113C receives the extended LSID transmitted from the ROUTE server 10B, and supplies it to the transfer processing unit 114C. The transfer processing unit 114C applies processing to transfer the extended LSID and to supply it to the transmission unit 115C according to the control by the control unit 111C. The transmission unit 115C transmits (transfers) the extended LSID supplied from the transfer processing unit 114C to the reception side system 20 (ATSC broadcasting client 20C) via the antenna 116C and the transmission path 80.

Furthermore, the transmission/reception unit 113C receives the ROUTE data transmitted from the ROUTE server 10B, and supplies it to the transfer processing unit 114C. The transfer processing unit 114C applies processing to transfer the ROUTE data on the transport bearer of ATSC3.0, and to supply the bearer data thus obtained to the transmission unit 115C according to the control by the control unit 111C. The transmission unit 115C transmit (transfer) the bearer data supplied from the transfer processing unit 114C to the reception side system 20 (ATSC broadcasting client 20C) via the antenna 116C and the transmission path 80.

The ATSC broadcasting server 10C is configured as described above.

In FIG. 23, the 3GPPMBMS server 10D is configured of the control unit 111D, the bearer processing unit 112D, the transmission/reception unit 113D, the transfer processing unit 114D, and the transmission unit 115D.

The control unit 111D controls operations of the respective units of the 3GPPMBMS server 10D. The transmission/reception unit 113D exchanges a variety of data with other servers such as the ROUTE server 10B according to the control by the control unit 111D.

The transmission/reception unit 113D receives the reservation request of the transport resource of 3GPP-MBMS transmitted from the ROUTE server 10B, and supplies it to the bearer processing unit 112D. The bearer processing unit 112D ensures the transport resource of 3GPP-MBMS upon a reservation request supplied from the transmission/reception unit 113D according to the control by the control unit 111D.

The bearer processing unit 112D generates the transport bearer ID of 3GPP-MBMS upon the reservation request supplied from the transmission/reception unit 113D, and supplies it to the transmission/reception unit 113D according to the control by the control unit 111D. The transmission/reception unit 113D transmits the ROUTE server 10B with the transport bearer ID of 3GPP-MBMS supplied from the bearer processing unit 112D according to the control by the control unit 111D.

The transmission/reception unit 113D receives the extended LSID transmitted from the ROUTE server 10B, and supplies it to the transfer processing unit 114D. The transfer processing unit 114D applies processing to transfer the extended LSID and to supply it to the transmission unit 115D according to the control by the control unit 111D. The transmission unit 115D transmits (transfers) the extended LSID supplied from the transfer processing unit 114D to the reception side system 20 (3GPPMBMS client 20D) via the antenna 116D and the transmission path 80.

Furthermore, the transmission/reception unit 113D receives the ROUTE data transmitted from the ROUTE server 10B, and supplies it to the transfer processing unit 114D. The transfer processing unit 114D applies processing to transfer the ROUTE data on the transport bearer of 3GPP-MBMS, and to supply the bearer data thus obtained to the transmission unit 115D according to the control by the control unit 111D. The transmission unit 115D transmits (transfers) the bearer data supplied from the transfer processing unit 114D to the reception side system 20 (3GPP-MBMS client 20D) via the antenna 116D and the transmission path 80.

The 3GPPMBMS server 10D is configured as described above.

(Configuration Example of Reception Side System)

Figure 24:
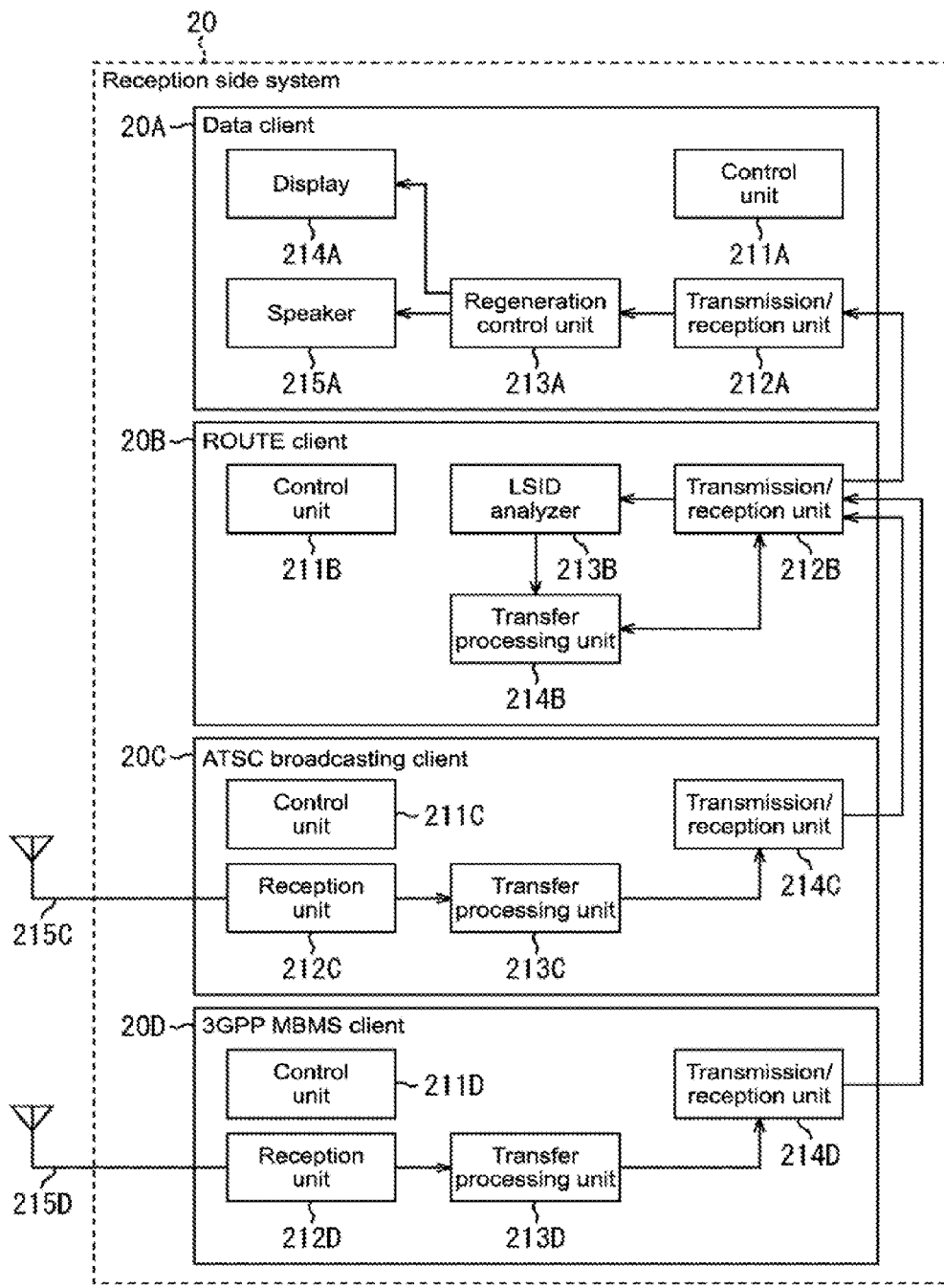
FIG. 24 A diagram showing a configuration example of a reception side system.

FIG. 24 is a diagram showing a configuration example of the reception side system 20 in FIG. 10.

The reception side system 20 is configured of the data client 20A, the ROUTE client 20B, the ATSC broadcasting client 20C, and the 3GPPMBMS client 20D.

In FIG. 24, 3GPPMBMS client 20D is configured of the control unit 211D, a reception unit 212D, a transfer processing unit 213D, and a transmission/reception unit 214C.

The control unit 211D controls operations of the respective units of the 3GPPMBMS client 20D.

The reception unit 212D receives the extended LSID via an antenna 215 transmitted from the transmission side system 10 (3GPPMBMS server 10D) via the transmission path 90, and supplies it to the transfer processing unit 213D according to the control by a control unit 211D. The transfer processing unit 213D applies processing to transfer the extended LSID and to supply it to the transmission/reception unit 214D according to the control by the control unit 111D. The transmission/reception unit 214D transmits the extended LSID supplied from the transfer processing unit 213D to the ROUTE client 20B according to the control by a control unit 211D.

The reception unit 212D receives the bearer data via an antenna 215D transmitted from the transmission side system 10 (3GPPMBMS server 10D) via the transmission path 90 according to the control by the control unit 211D, and supplies it to the transfer processing unit 213D. The transfer processing unit 213D processes the bearer data for transmitting the ROUTE data over the transport bearer of 3GPP-MBMS, and supplies it to the transmission/reception unit 214D according to the control by the control unit 211D. The transmission/reception unit 214D transmits the bearer data supplied from the transfer processing unit 213D to the ROUTE client 200 according to the control by the control unit 211D.

The 3GPPMBMS client 20D is configured as described above.

In FIG. 24, an ATSC broadcasting client 20C is configured of a control unit 211C, a reception unit 212C, a transfer processing unit 213C, and a transmission/reception unit 214C.

The control unit 211C controls operations of the respective units of the ATSC broadcasting client 20C.

The reception unit 212C receives the extended LSID via an antenna 215C transmitted from the transmission side system 10 (ATSC broadcasting server 10C) via the transmission path 80 and, and supplies it to the transfer processing unit 213C according to the control by the control unit 211C. The transfer processing unit 213C performs processing for transferring to the extended LSID, and supplies it to transmission/reception unit 214C according to the control by the control unit 211C. The transmission/reception unit 214C transmits the extended LSID supplied from the transfer processing unit 213C to the ROUTE client 20B according to the control by the control unit 211C.

The reception unit 212C receives the bearer data via the antenna 215C transmitted from the transmission side system 10 (ATSC broadcasting server 10C) via the transmission path 80, and supplies it to the transfer processing unit 213C according to the control by the control unit 211C. The transfer processing unit 213C processes the bearer data for transmitting the ROUTE data on the transport bearer of ATSC3.0, and supplies it to the transmission/reception unit 214C according to the control by the control unit 211C. The transmission/reception unit 214C transmits the bearer data supplied from the transfer processing unit 213C to the ROUTE client 20B according to the control by the control unit 211C.

The ATSC broadcasting client 20C is configured as described above.

In FIG. 24, the ROUTE client 20B is configured of a control unit 211B, a transmission/reception unit 212B, an LSID analyzer 213B, and a transfer processing unit 214B.

The control unit 211B controls operations of the respective units of the ROUTE client 20B.

The transmission/reception unit 212B receives the extended LSID transmitted from the 3GPPMBMS client 200 or the ATSC broadcasting client 20C, and supplies it to the LSID analyzer 213B according to the control by the control unit 211B.

The LSID analyzer 213B analyzes the extended LSID (for example, the extended LSID in FIG. 19 or FIG. 21) supplied from the transmission/reception unit 212B, and supplies an analyzed result to the transfer processing unit 214B according to the control by the control unit 211B. Also, the LSID analyzer 213B selects the transport bearer for acquiring the ROUTE data according to the analyzed result of the extended LSID, and supplies a selection result to the transfer processing unit 214B.

The transmission/reception unit 212B receives the bearer data transmitted from the 3GPPMBMS client 20D or the ATSC broadcasting client 20C, and supplies it to the transfer processing unit 214B according to the control by the control unit 211B. The transfer processing unit 214B selects the bearer data (transport bearer of 3GPP-MBMS or ATSC3.0) according to the selection result of the transport bearer from the LSID analyzer 213B. Also, the transfer processing unit 214B acquires the ROUTE data transmitted by the selected bearer data (on the transport bearer of 3GPP-MBMS or ATSC3.0), and supplies it to the transmission/reception unit 212B.

The transmission/reception unit 212B transmits the ROUTE data supplied from the transfer processing unit 214B to the data client 20A according to the control by the control unit 211B.

The ROUTE client 20B is configured as described above.

In FIG. 24, the data client 20A is configured of a control unit 211A, a transmission/reception unit 212A, a regeneration control unit 213A, a display 214A, and a speaker 215A.

The control unit 211A controls operations of the respective units of the data client 20A.

The transmission/reception unit 212A receives the ROUTE data transmitted from the ROUTE client 20B, and supplies it to the regeneration control unit 213A according to the control by the control unit 211A.

The regeneration control unit 213A performs rendering on the ROUTE data supplied from the transmission/reception unit 212A according to the control by the control unit 211A. By the rendering, video data of the contents (for example, contents suitable for the simultaneous multi-destination delivery) is supplied to the display 214A, and audio data is supplied to a speaker 215A.

The display 214A displays video corresponding to the video data supplied from the regeneration control unit 213A according to the control by the control unit 211A. Also, the speaker 215A outputs sound corresponding to the audio data supplied from the regeneration control unit 213A according to the control by the control unit 211A.

The data client 20A is configured as described above.

<6. Flow of Processing Executed by Apparatuses in System>

Next, a flow of processing executed by apparatuses configuring the transmission side system 10 and the reception side system 20 in the transmission system 1 will be described.

(Flow of Processing by Apparatuses of Transmission Side System)

Figure 25:
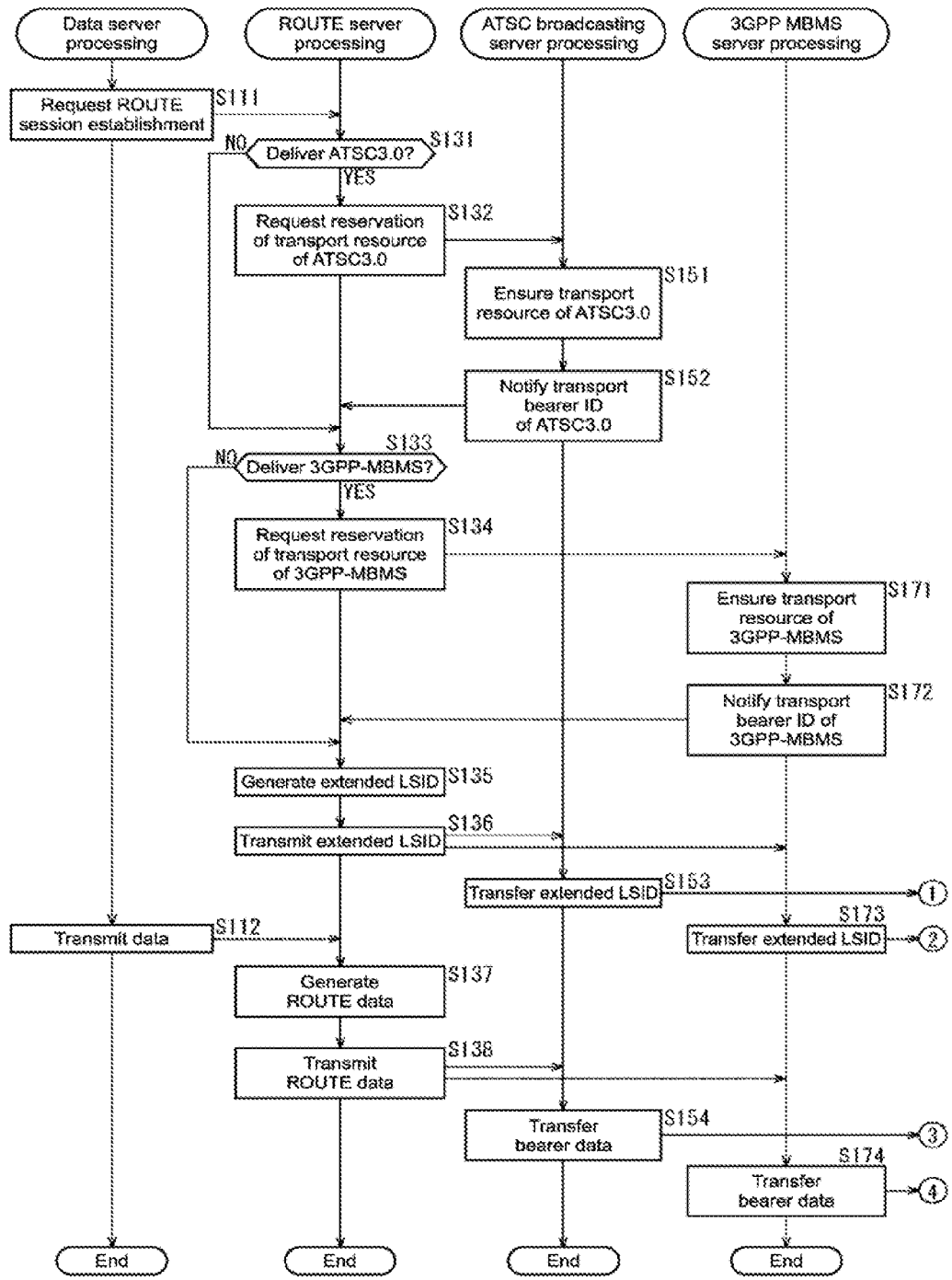
FIG. 25 A flowchart for explaining a flow of processing of a transmission side system.

First, referring to a flow chart in FIG. 25, a flow of processing by apparatuses in the transmission side system 10 will be described.

In Step S111, the session request unit 112A of the data server 10A controls the transmission/reception unit 113A according to the control by the control unit 111A, and requests an establishment of the ROUTE session to the ROUTE server 105. The establishment request for the session from the data server 10A is received by the transmission/reception unit 113B of the ROUTE server 10B.

In Step S131, the session processing unit 112B of the ROUTE server 10B determines whether or not the establishment request of the session from the data server 10A requests a delivery using the transport bearer of ATSC3.0.

In Step S131, if it is determined that the delivery using the transport bearer of ATSC3.0 is requested, the processing proceeds to Step S132. In Step S132, the session processing unit 112B of the ROUTE server 10B controls the transmission/reception unit 113B according to the control by the control unit 111B, and requests a reservation of a transport resource of ATSC3.0 to the ATSC broadcasting server 100C. The reservation request of the transport resource of ATSC3.0 from the ROUTE server 10B is received by the transmission/reception unit 113C of the ATSC broadcasting server 10C.

In Step S151, the bearer processing unit 112C of the ATSC broadcasting server 10C ensures the transport resource of ATSC3.0 corresponding to the reservation request of ATSC3.0 according to the control by the control unit 111C.

In Step S152, the bearer processing unit 112C of the ATSC broadcasting server 10C generates the transport bearer ID of ATSC3.0 according to the control by the control unit 111C, and notifies it to the ROUTE server 10B via the transmission/reception unit 113C. The transport bearer ID of ATSC3.0 from the ATSC broadcasting server 10C is received by the transmission/reception unit 113B of the ROUTE server 10B.

Note that, in Step S131, if it is determined that the delivery using the transport bearer of ATSC3.0 is not requested, the above-described processing in Steps S132, S151 and S152 is skipped.

In Step S133, the session processing unit 112B of the ROUTE server 10B determines whether or not the establishment request of the session from the data server 10A requests the delivery using the transport bearer of 3GPP-MBMS.

In Step S133, if it is determined that the delivery using the transport bearer of 3GPP-MBMS is requested, the processing proceeds to Step S134. In Step S134, the session processing unit 112B of the ROUTE server 10B controls the transmission/reception unit 113B according to the control by the control unit 111B, and requests a reservation of a transport resource of 3GPP-MBMS to the 3GPPMBMS server 10D. The reservation request of the transport resource of 3GPP-MBMS from the 3GPPMBMS 10D is received by the transmission/reception unit 113D of the 3GPPMBMS server 10D.

In Step S171, the bearer processing unit 112D of the 3GPPMBMS server 10D ensures the transport resource of 3GPP-MBMS corresponding to the reservation request of 3GPP-MBMS according to the control by the control unit 111D.

In Step S172, the bearer processing unit 112D of the 3GPPMBMS server 10D generates the transport bearer ID of 3GPP-MBMS according to the control by the control unit 111D, and notifies it to the ROUTE server 10B via the transmission/reception unit 113D. The transport bearer ID of 3GPP-MBMS from the 3GPPMBMS server 10D is received by the transmission/reception unit 113B of the ROUTE server 10B.

Note that, in Step S133, if it is determined that the delivery using the transport bearer of 3GPP-MBMS is not requested, the above-described processing in Steps S134, S171 and S172 is skipped.

In Step S135, the LSID generator 114B of the ROUTE server 10B generates the transport bearer ID of ATSC3.0 or 3GPP-MBMS supplied from the session processing unit 112B according to the control by the control unit 11B, and the extended LSID (for example, extended LSID in FIG. 19 or FIG. 21) based on the original data for generating the extended LSID.

In Step S136, the transmission/reception unit 113B of the ROUTE server 10B transmits the extended LSID generated by processing in Step S135 to at least one of the ATSC broadcasting server 100 and the 3GPPMBMS server 10D according to the control by the control unit 111B.

In Step S153, the transfer processing unit 114D of the ATSC broadcasting server 100 controls the transmission unit 115D according to the control by the control unit 111D, when the extended LSID is received from the ROUTE server 10B, whereby the extended LSID received from the ROUTE server 10B is transmitted (transferred) to the reception side system 20 (ATSC broadcasting client 20C) via the transmission path 80.

In Step S173, the transfer processing unit 114D of the 3GPPMBMS server 10D controls the transmission unit 115D according to the control by the control unit 111D, when the extended LSID of the ROUTE server 10B is received, whereby the extended LSID received from the ROUTE server 10B is transmitted (transferred) to the reception side system 20 (3GPPMBMS client 20D) via the transmission path 90.

In Step S112, the data transfer processing unit 114A of the data server 10A acquires the data of contents held in the data holding unit 115A and controls the transmission/reception unit 113A according to the control by the control unit 111A, thereby transmitting the data to the ROUTE server 10B. The data from the data server 10A is received by the transmission/reception unit 113B of the ROUTE server 10B.

In Step S137, the ROUTE data generator 115B of the ROUTE server 10B generates the ROUTE data that is transmitted through the ROUTE session according to the control by the control unit 111B based on the data from the transmission/reception unit 113B.

In Step S138, the transmission/reception unit 113B of the ROUTE server 10B transmits the ROUTE data generated by the processing in Step S137 to at least one of the ATSC broadcasting server 10C and the 3GPPMBMS server 10D according to the control by the control unit 111B.

Here, if it is determined that the delivery using the transport bearer of ATSC3.0 is performed by the processing in Step S131, and the extended LSID including the transport bearer ID of ATSC3.0 from the ATSC broadcasting server 10C is generated, the ROUTE data generated by the processing in Step S137 is transmitted to the ATSC broadcasting server 10C. If it is determined that the delivery using the transport bearer of 3GPP-MBMS is performed by the processing in Step S133, and the extended LSID including the transport bearer ID of 3GPP-MBMS from the 3GPPMBMS server 10D is generated, by the ROUTE data generated by the processing in Step S137 is transmitted to the 3GPP-MBMS server 10D.

In Step S154, the transfer processing unit 114C of the ATSC broadcasting server 10C processes the ROUTE data received from the ATSC broadcasting server 10C to be transmitted over the transport bearer of ATSC3.0 according to the control by the control unit 111C, when the ROUTE data is received from the ROUTE server 10B. Then, the transfer processing unit 114C controls the transmission unit 115C according to the control by the control unit 111C, and transmits (transfers) the bearer data (the ROUTE data transmitted over the transport bearer of ATSC3.0) to the reception side system 20 (ATSC broadcasting client 20C) via the transmission path 80.

In Step S174, the transfer processing unit 114D of the 3GPPMBMS server 10D processes the ROUTE data received from the ATSC broadcasting server 10C to be transmitted over the transport bearer of 3GPP-MBMS according to the control by the control unit 111D, when the ROUTE data is received from the ROUTE server 10B. Then, the transfer processing unit 114D controls the transmission unit 115D according to the control by the control unit 111D, and transmits (transfers) the bearer data (the ROUTE data transmitted over transport bearer of 3GPP-MBMS) to the reception side system 20 (3GPPMBMS client 20D) via the transmission path 90.

In the above, the flow of processing by the apparatuses in the transmission side system 10 has been described.

(Flow of Processing by Apparatuses of Reception Side System)

Figure 26:
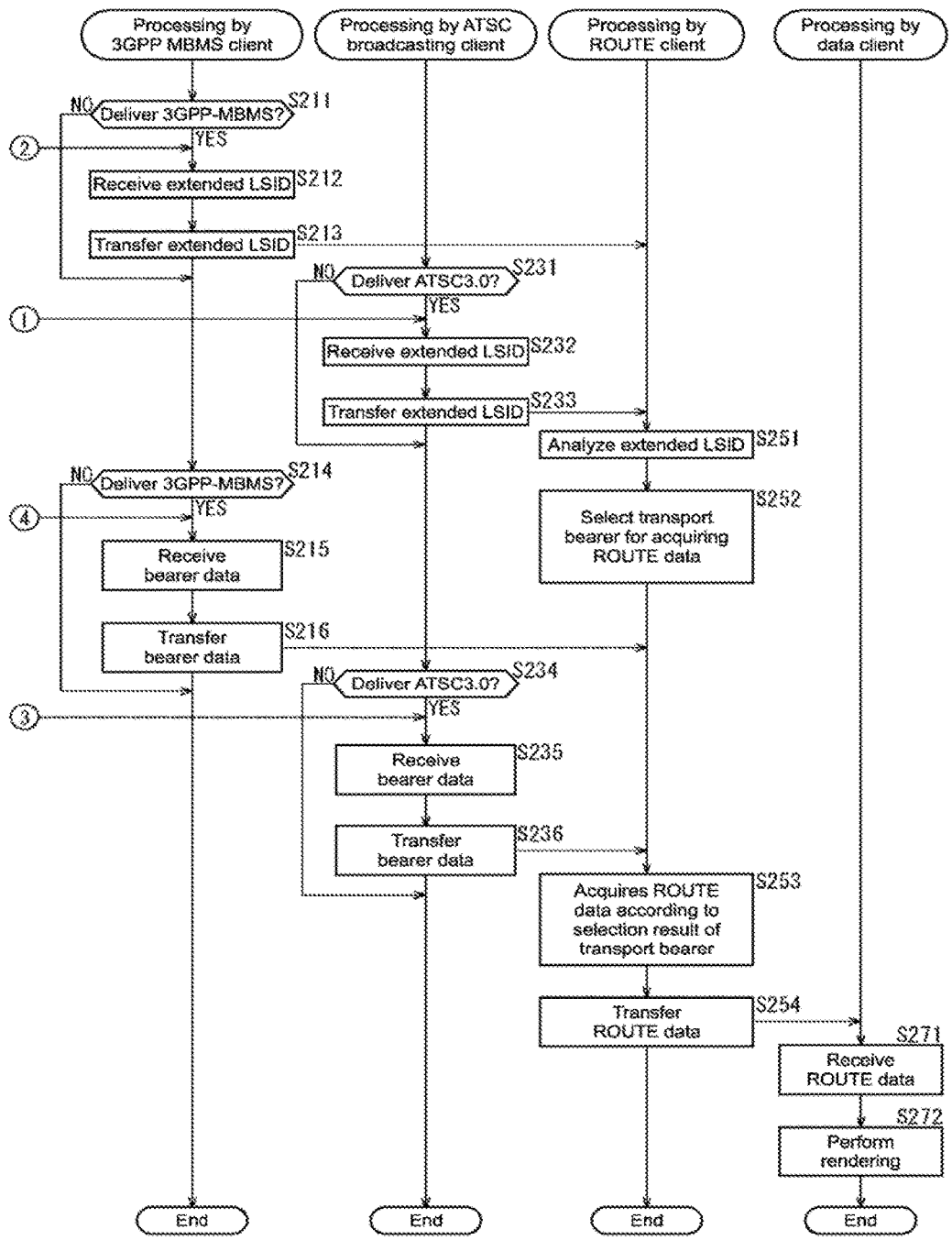
FIG. 26 A flowchart for explaining a flow of processing of a reception side system.

Next, referring to a flowchart in FIG. 26, a flow of processing by the apparatuses configuring the reception side system 20 will be described.

In Step S211, it is determined that whether or not 3GPP-MBMS is delivered. In Step S211, if it is determined that 3GPP-MBMS is delivered, the processing proceeds to Step S212.

In Step S212, the reception unit 212D of the 3GPPMBMS client 20D receives the extended LSID from the transmission side system 10 (3GPPMBMS server 10D) through the transmission path 90. In Step S213, the transfer processing unit 213D controls the transmission/reception unit 214D according to the control by the control unit 211D, and transfers the extended LSID received by the processing in Step S212 to the ROUTE client 20B.

Note that, in Step S211, if it is determined that 3GPP-MBMS is not delivered, the above-described processing in Steps S212 and S213 is skipped.

In Step S231, it is determined that whether or not ATS3.0 is delivered. In Step S231, if it is determined that ATSC3.0 is delivered, the processing proceeds to Step S232.

In Step S232, the reception unit 212C of ATSC broadcasting client 20C receives the extended LSID transmitted from the transmission side system 10 (ATSC broadcasting server 100) via the transmission path 80. In Step S233, the transfer processing unit 213C controls the transmission/reception unit 214C according to the control by the control unit 211C, and transfers the extended LSID received by the processing in Step S232 to the ROUTE client 20B.

Note that, in Step S211, if it is determined that ATSC3.0 is not delivered, the above-described processing in Steps S232 and S233 is skipped.

The extended LSID transmitted from the 3GPPMBMS client 20D or the ATSC broadcasting client 20C is received by the transmission/reception unit 212B of the ROUTE client 20B.

In Step S251, the LSID analyzer 213B analyzes the extended LSID (for example, the extended LSID in FIG. 19 or FIG. 21) from the 3GPPMBMS client 20D or the ATSC broadcasting client 20C. In Step S252, the LSID analyzer 213B selects the transport bearer for acquiring the ROUTE data transmitted through (the LCT session) the ROUTE session according to the analyzed result in Step S252.

In Step S214, it is determined that whether or not 3GPP-MBMS is delivered. In Step S214, if it is determined that 3GPP-MBMS is delivered, the processing proceeds to Step S215.

In Step S215, the reception unit 212D of the 3GPPMBMS client 20D receives the bearer data (the ROUTE data transmitted over the transport bearer of 3GPP-MBMS) transmitted from the 3GPPMBMS server 10D via the transmission path 90. In Step S216, the transfer processing unit 213D controls the transmission/reception unit 214D according to the control by the control unit 211D, and transfers the bearer data received by the processing in Step S215 to the ROUTE client 20B.

Note that, in Step S214, if it is determined that 3GPP-MBMS is not delivered, the above-described processing in Steps S215 and S216 is skipped.

In Step S234, it is determined that whether or not ATSC3.0 is delivered. In Step S234, if it is determined that ATSC3.0 is delivered, the processing proceeds to Step S235.

In Step S235, the reception unit 212C of the ATSC broadcasting client 20C receives the bearer data (the ROUTE data transmitted over the transport bearer of ATSC3.0) transmitted from the ATSC broadcasting server 10C via the transmission path 80. In Step S236, the transfer processing unit 213C controls the transmission/reception unit 214C according to the control by the control unit 211C, and transfers the bearer data received by the processing in Step S235 to the ROUTE client 20B.

Note that, in Step S234, if it is determined that ATSC3.0 is not delivered, the above-described processing in Steps S235 and S236 is skipped.

The bearer data from the 3GPPMBMS client 20D (the ROUTE data transmitted over the transport bearer of 3GPP-MBMS) or the bearer data from the ATSC broadcasting client 20C (the ROUTE data transmitted over the transport bearer of ATSC3.0) are received by the transmission/reception unit 212B of the ROUTE client 20B.

In Step S253, the transfer processing unit 214B of the ROUTE client 20B acquires the ROUTE data transmitted over the 3GPP-MBMS or ATSC3.0 transport bearer according to the selection result of the transport bearer in Step S252.

In Step S254, the transfer processing unit 214B controls the transmission/reception unit 212B according to the control by the control unit 211B, and transfers the ROUTE data acquired by the processing in Step S253 to the data client 20A.

In Step S271, the transmission/reception unit 212A of the data client 20A receives the ROUTE data transmitted from the ROUTE client 20B according to the control by the control unit 211A.

In Step S272, the regeneration processing unit 213A performs rendering on the ROUTE data received by the processing in Step S271 according to the control by the control unit 211A. By the rendering, video data of the contents is supplied to the display 214A, and audio data is supplied to a speaker 215A. In this manner, the video of the contents is displayed on the display 214A, and the sound thereof is output from the speaker 215A.

In the above, the flow of processing by the apparatuses configuring the reception side system 20 has been described.

<7. Alternative Embodiment>

In the above description, the ATSC system that is employed mainly in U.S. is described as a standard for a digital television broadcasting. Alternatively, an ISDB (Integrated Services Digital Broadcasting) system that is employed in Japan, etc. or a DVB system that is used in European countries may be used. In addition, not only a terrestrial digital television broadcasting, but also a satellite digital television broadcasting and a digital cable television broadcasting may be employed.

In the above description, the elements and the attributes are described when the signaling information is described in a Markup Language such as the XML. The names of the elements and attributes are illustrative, and other names may be employed. For example, the broadcasting stream ID specified in the LSID or the like may be referred to as an RF Channel ID, a Network ID, or an RF allocation ID (RF Alloc ID). Note that a difference in the names is a format difference, and substantial contents of the elements and the attributes are not different. Similarly, the name of the signaling information is only illustrative, and other names may be employed.

<8. Configuration of Computer>

Figure 27:
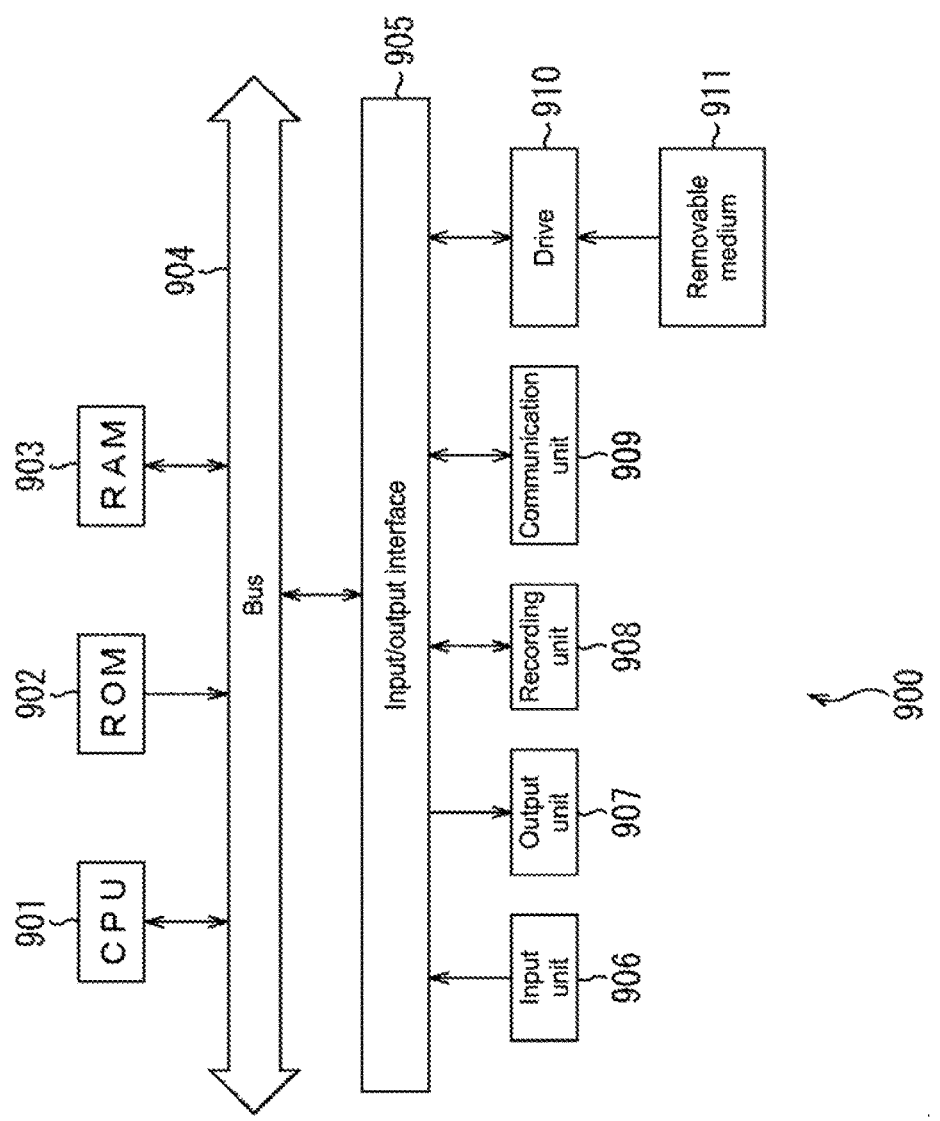
FIG. 27 A diagram showing a configuration example of a computer.

The above-mentioned series of processing may be executed by hardware or may be executed by software. If the series of processing is executed by software, programs configuring that software are installed into a computer. FIG. 27 is a diagram showing a configuration example of hardware of a computer that executes the above-mentioned series of processing according to the programs.

In a computer 900, a CPU (Central Processing Unit) 901, a ROM (Read Only Memory) 902, and a RAM (Random Access Memory) 903 are connected to one another via a bus 904. An input/output interface 905 is further connected to the bus 904. An input unit 906, an output unit 907, a recording unit 908, a communication unit 909, and a drive 910 are connected to the input/output interface 905.

The input unit 906 is constituted of a keyboard, a mouse, a microphone, and the like. The output unit 907 is constituted of a display, a speaker, and the like. The recording unit 908 is constituted of a hard disk, a nonvolatile memory, and the like. The communication unit 909 is constituted of a network interface and the like. The drive 910 drives a removable medium 911 such as a magnetic disk, an optical disc, a magneto-optical disk, and a semiconductor memory.

In the thus configured computer 900, the above-mentioned series of processing is performed by the CPU 901 loading programs stored in the ROM 902 and the recording unit 908 into the RAM 903 via the input/output interface 905 and the bus 904 and executing them.

The programs executed by the computer 900 (CPU 901) can be recorded and provided on the removable medium 911 as a package medium, for example. Further, the programs can be provided via a wired or wireless transmission medium such as a local-area network, the Internet, and digital satellite broadcasting.

In the computer 900, the programs can be installed into the recording unit 908 via the input/output interface 905 by the removable medium 911 being mounted on the drive 910. Further, the programs can be received by the communication unit 909 via the wired or wireless transmission medium and installed into the recording unit 908. Otherwise, the programs can be installed into the ROM 902 or the recording unit 908 in advance.

In the present specification, the processing executed by the computer according to the programs does not necessarily need to be performed in a time sequence in the order described as the flowchart. That is, the processing executed by the computer according to the programs includes processes executed in parallel or individually (e.g., parallel processing or processing by objects). Further, the programs may be processed by a single computer (processing unit) or may be processed by a plurality of computers in a distributed manner.

Note that embodiments of the present technology are not limited to the above-mentioned embodiments and various modifications can be made without departing from the gist of the present technology.

It should be noted that the present technology may take the following configurations.

(1) A reception apparatus, including:

an acquisition unit that acquires control information including information for acquiring data transmitted through a session in a first transmission system at a first layer in a protocol stack of an IP (Internet Protocol) transmission system and for identifying a bearer that transmits the data in a second transmission system at a second layer lower than the first layer; and a control unit that controls an operation of each unit that acquires the data transmitted on the bearer on the basis of the control information.

(2) The reception apparatus according to (1), in which:

the first layer is a transport layer, and the second layer is a physical layer.

(3) The reception apparatus according to (1) or (2), in which:

the control information includes a bearer ID for identifying the bearer.

(4) The reception apparatus according to any one of (1) to (3), in which:
the control information includes an IP address and a port number for identifying the session.

(5) The reception apparatus according to any one of (1) to (4), in which:
the first transmission system is ROUTE (Real-time Object Delivery over Unidirectional Transport),
the session is one or a plurality of LCT (Layered Coding Transport) sessions that configure the ROUTE session, and
the control information is LSID (LCT Session Instance Description).

(6) The reception apparatus according to any one of (3) to (5), in which:
the second transmission system includes ATSC (Advanced Television Systems Committee) 3.0 and 3GPP-MBMS (Third Generation Partnership Project—Multimedia Broadcast Multicast Service),
the bearer ID of ATSC3.0 is a set of
a first identifier that is a set of an identifier assigned per reach area of a broadcast wave and an identifier of a frequency band assigned to a broadcast wave of a certain channel, and
a second identifier that identifies each physical pipe, the each physical pipe being obtained by dividing the frequency band identified by the first identifier into a plurality of physical pipes having different parameters, and
the bearer ID of ATSC3.0 is TMGI (Temporary Mobile Group Identity).

(7) A reception method used in a reception apparatus, including the steps of:
acquiring control information including information for acquiring data transmitted through a session in a first transmission system at a first layer in a protocol stack of an IP transmission system and for identifying a bearer that transmits the data in a second transmission system at a second layer lower than the first layer; and
controls an operation of each unit that acquires the data transmitted on the bearer on the basis of the control information.

(8) A transmission apparatus, including:
a generation unit that generates control information including information for acquiring data transmitted through a session in a first transmission system at a first layer in a protocol stack of an IP transmission system and for identifying a bearer that transmits the data in a second transmission system at a second layer lower than the first layer; and
a transmission unit that transmits the data by the bearer identified by information included in the control information together with the control information.

(9) The reception apparatus according to (8), in which:
the first layer is a transport layer, and
the second layer is a physical layer.

(10) The reception apparatus according to (8) or (9), in which:
the control information includes a bearer ID for identifying the bearer.

(11) The reception apparatus according to any one of (8) to (10), in which:
the control information includes an IP address and a port number for identifying the session.

(12) The reception apparatus according to any one of (8) to (11), in which:
the first transmission system is ROUTE,
the session is one or a plurality of LCT sessions that configure the ROUTE session, and
the control information is LSID.

(13) The reception apparatus according to any one of (10) to (12), in which:
the second transmission system includes ATSC3.0 and 3GPP-MBMS,
the bearer ID of ATSC3.0 is a set of
a first identifier that is a set of an identifier assigned per reach area of a broadcast wave and an identifier of a frequency band assigned to a broadcast wave of a certain channel, and
a second identifier that identifies each physical pipe, the each physical pipe being obtained by dividing the frequency band identified by the first identifier into a plurality of physical pipes having different parameters, and
the bearer ID of ATSC3.0 is TMGI.

(14) A transmission method used in a transmission apparatus, including the steps of:
generating control information including information for acquiring data transmitted through a session in a first transmission system at a first layer in a protocol stack of an IP transmission system and for identifying a bearer that transmits the data in a second transmission system at a second layer lower than the first layer; and
transmitting the data by the bearer identified by information included in the control information together with the control information.

DESCRIPTION OF REFERENCE SYMBOLS

1 transmission system, 10 transmission side system, 10A data server, 10B ROUTE server, 10C ATSC broadcasting server, 10D 3GPPMBMS server, 20 reception side system, 20A data client, 20B ROUTE client, 20C ATSC broadcasting client, 20D 3GPPMBMS client, 80 transmission path, 90 transmission path, 114B LSID generator, 115B ROUTE data generator, 114C transfer processing unit, 115C transmission unit, 114D transfer processing unit, 115D transmission unit, 213A regeneration control unit, 213B LSID analyzer, 214B transfer processing unit, 212C reception unit, 213C transfer processing unit, 212D reception unit, 213D transfer processing unit, 900 computer, 901 CPU

The invention claimed is:

1. A reception apparatus, comprising:
circuitry configured to:
receive control information regarding acquiring transport data transmitted through a ROUTE (Real-time Object Delivery over Unidirectional Transport) data transport session using a ROUTE protocol, the control information including bearer information identifying bearers that each transmits the transport data for the ROUTE data transport session by transmitting bearer data according to respective bearer protocols;
select one of the bearers identified in the received control information; and
acquire the transport data from the bearer data transmitted on the selected bearer.

2. The reception apparatus according to claim 1, wherein the bearer information includes a bearer identifier for identifying a particular one of the bearers.

3. The reception apparatus according to claim 1, wherein the control information includes an IP address and a port number for identifying the ROUTE data transport session.

4. The reception apparatus according to claim 1, wherein the ROUTE data transport session includes one or a plurality of LCT (Layered Coding Transport) sessions, and
the control information includes an LSID (LCT Session Instance Description).

5. The reception apparatus according to claim 1, wherein the bearer protocols includes an ATSC (Advanced Television Systems Committee) 3.0 protocol and a 3GPP-MBMS (Third Generation Partnership Project-Multimedia Broadcast Multicast Service) protocol,
the bearer information includes a first bearer identifier identifying an ATSC 3.0 bearer that uses the ATSC 3.0 protocol and a second bearer identifier identifying a 3GPP-MBMS bearer that uses the 3GPP-MBMS protocol,
the first bearer identifier includes
a first identifier that includes a first part corresponding to an area reachable by a broadcast wave and a second part corresponding to a frequency band assigned to the broadcast wave, and
a second identifier identifying a physical pipe, the physical pipe being one of a plurality of physical pipes obtained by dividing the frequency band identified by the first identifier, and
the second identifier includes a TMGI (Temporary Mobile Group Identity) identifier.

6. The reception apparatus according to claim 1, wherein the bearer protocols include an ATSC (Advanced Television Systems Committee) 3.0 protocol or a 3GPP-MBMS (Third Generation Partnership Project-Multimedia Broadcast Multicast Service) protocol.

7. A reception method for a reception apparatus, the method comprising:
receiving control information regarding acquiring transport data transmitted through a ROUTE (Real-time Object Delivery over Unidirectional Transport) data transport session using a ROUTE protocol, the control information including bearer information identifying bearers that each transmits the transport data for the ROUTE data transport session by transmitting bearer data according to respective bearer protocols;
selecting, by circuitry of the reception apparatus, one of the bearers identified in the received control information; and
acquiring, by the circuitry of the reception apparatus, the transport data from the bearer data transmitted on the selected bearer.

8. The reception method according to claim 7, wherein the bearer protocols include an ATSC (Advanced Television Systems Committee) 3.0 protocol or a 3GPP-MBMS (Third Generation Partnership Project-Multimedia Broadcast Multicast Service) protocol.

9. The reception method according to claim 7, wherein the ROUTE data transport session includes one or a plurality of LCT (Layered Coding Transport) sessions, and
the control information includes an LSID (LCT Session Instance Description).

10. A transmission apparatus, comprising:
circuitry configured to:
generate control information regarding transmitting transport data transmitted through a ROUTE (Real-time Object Delivery over Unidirectional Transport) data transport session using a ROUTE protocol, the control information including bearer information identifying bearers that each transmits the transport data for the ROUTE data transport session by transmitting bearer data according to respective bearer protocols; and
output the control information and the transport data for transmission on the bearers identified in the control information.

11. The transmission apparatus according to claim 10, wherein the bearer information includes a bearer identifier for identifying a particular one of the bearers.

12. The transmission apparatus according to claim 10, wherein the control information includes an IP address and a port number for identifying the ROUTE data transport session.

13. The transmission apparatus according to claim 10, wherein the ROUTE data transport session includes one or a plurality of LCT (Layered Coding Transport) sessions, and the control information includes an LSID (LCT Session Instance Description).

14. The transmission apparatus according to claim 10, wherein the bearer protocols includes an ATSC (Advanced Television Systems Committee) 3.0 protocol and a 3GPP-MBMS (Third Generation Partnership Project-Multimedia Broadcast Multicast Service) protocol, the bearer information includes a first bearer identifier identifying an ATSC 3.0 bearer that uses the ATSC 3.0 protocol and a second bearer identifier identifying a 3GPP-MBMS bearer that uses the 3GPP-MBMS protocol, the first bearer identifier includes a first identifier that includes a first part corresponding to an area reachable by a broadcast wave and a second part corresponding to a frequency band assigned to the broadcast wave, and a second identifier identifying a physical pipe, the physical pipe being one of a plurality of physical pipes obtained by dividing the frequency band identified by the first identifier, and the second identifier includes a TMGI (Temporary Mobile Group Identity) identifier.

15. The transmission apparatus according to claim 10, wherein
the bearer protocols include an ATSC (Advanced Television Systems Committee) 3.0 protocol or a 3GPP-MBMS (Third Generation Partnership Project-Multimedia Broadcast Multicast Service) protocol.

16. A transmission method for a transmission apparatus, the method comprising:
generating, by circuitry of the transmission apparatus, control information regarding transmitting transport data transmitted through a ROUTE (Real-time Object Delivery over Unidirectional Transport) data transport session using a ROUTE protocol, the control information including bearer information identifying bearers that each transmits the transport data for the ROUTE data transport session by transmitting bearer data according to respective bearer protocols; and
outputting the control information and the transport data for transmission on the bearers identified in the control information.

17. The transmission method according to claim 16, wherein
the bearer protocols include an ATSC (Advanced Television Systems Committee) 3.0 protocol or a 3GPP-MBMS (Third Generation Partnership Project-Multimedia Broadcast Multicast Service) protocol.

18. The transmission method according to claim 16, wherein
the ROUTE data transport session includes one or a plurality of LCT (Layered Coding Transport) sessions, and the control information includes an LSID (LCT Session Instance Description).

* * * * *